(12) United States Patent
Sobhy Deraz et al.

(10) Patent No.: US 11,900,133 B2
(45) Date of Patent: Feb. 13, 2024

(54) DISCOVERY AND SUGGESTIONS FOR UNSTRUCTURED TABLES IN SPREADSHEETS

(71) Applicant: Microsoft Technology Licensing, LLC, Redmond, WA (US)

(72) Inventors: Ehab Sobhy Deraz, Bellevue, WA (US); Brenton Aihe Milne, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/539,798

(22) Filed: Dec. 1, 2021

(65) Prior Publication Data
US 2023/0168910 A1 Jun. 1, 2023

(51) Int. Cl.
*G06F 40/00* (2020.01)
*G06F 9/451* (2018.01)
*G06F 16/22* (2019.01)
*G06F 40/106* (2020.01)
*G06F 40/18* (2020.01)

(52) U.S. Cl.
CPC .......... *G06F 9/453* (2018.02); *G06F 16/2282* (2019.01); *G06F 40/106* (2020.01); *G06F 40/18* (2020.01)

(58) Field of Classification Search
CPC ................................ G06F 40/106; G06F 40/18
See application file for complete search history.

(56) References Cited

U.S. PATENT DOCUMENTS

| 5,845,300 | A  | * | 12/1998 | Comer | G06F 40/18 715/203 |
| 6,430,584 | B1 | * | 8/2002 | Comer | G06F 40/18 715/212 |
| 7,693,860 | B2 | * | 4/2010 | Babanov | G06F 40/18 707/803 |
| 10,540,434 | B2 | * | 1/2020 | Migeon | G06F 40/18 |
| 2011/0029852 | A1 | * | 2/2011 | Naibo | G06F 40/18 715/212 |
| 2013/0038612 | A1 | * | 2/2013 | Hanumara | G06Q 30/02 345/440 |
| 2013/0097177 | A1 | * | 4/2013 | Fan | G06F 40/18 707/805 |
| 2013/0124960 | A1 | * | 5/2013 | Velingkar | G06F 40/18 715/220 |
| 2013/0145244 | A1 |  | 6/2013 | Rothschiller |  |
| 2014/0372854 | A1 | * | 12/2014 | Otero | G06F 40/18 715/219 |

(Continued)

OTHER PUBLICATIONS

"International Search Report and Written Opinion Issued in PCT Application No. PCT/US22/041792", dated Dec. 15, 2022, 10 Pages.

*Primary Examiner* — Barbara M Level

(57) ABSTRACT

In an implementation, a computing device under the control of a spreadsheet application displays a spreadsheet in a user interface. The application detects a user action in the spreadsheet associated with an unstructured table and responsively drives the computer to display a suggestion component in the user interface. A selection of the component causes the computer to display a preview of a suggested table feature in the user interface.

20 Claims, 28 Drawing Sheets

(56) References Cited

U.S. PATENT DOCUMENTS

| | | | |
|---|---|---|---|
| 2015/0378978 A1* | 12/2015 | Gross | G06F 40/18 |
| | | | 715/219 |
| 2016/0142488 A1* | 5/2016 | Adler | G06F 40/18 |
| | | | 709/217 |
| 2016/0154780 A1* | 6/2016 | Otero | G06F 3/0488 |
| | | | 715/213 |
| 2017/0124047 A1* | 5/2017 | Campbell | G06F 3/165 |
| 2018/0088753 A1* | 3/2018 | Viégas | G06F 40/216 |
| 2018/0129373 A1* | 5/2018 | Ellis | G06F 40/18 |
| 2018/0295194 A1* | 10/2018 | Deraz | H04L 67/51 |
| 2020/0351283 A1 | 11/2020 | Salunke et al. | |
| 2021/0365450 A1 | 11/2021 | Mustafi | |

* cited by examiner

| | A | B | C | D | E | F | | Recommended Pivot Table |
|---|---|---|---|---|---|---|---|---|
| 1 | Pursuit Lead | Country | Customer Na | MSX ID | Period | MSP Stage (Pro | | 'Revenue – Sold' by 'Country' |
| 2 | Alice | US | Company1 | 3-0231 | P01 | 0.00 Disengaged 0% | | Row Labels  Sum of Revenue-Sold |
| 3 | Bob | US | Company2 | 3-0232 | P06 | 0.2 Develop 20% | | US  $12,425,936 |
| 4 | Bob | US | Company3 | 3-0233 | P05 | 0.2 Develop 20% | | Brazil  $4,842,662 |
| 5 | Bob | United States | Company4 | 3-0234 | P01 | 0.6 Proof 60% | | Mexico  $4,263,147 |
| 6 | Callie | United States | Company7 | 3-0237 | P05 | 0.4 Solution 40% | | United States  $1,399,795 |
| 7 | Bob | US | Company8 | 3-0238 | P02 | 0.00 Disengaged 0% | | Canada  $699,988 |
| 8 | Alice | US | Company9 | 3-0239 | P05 | 0.00 Disengaged 0% | | Argentina  $125,441 |
| 9 | Alice | US | Company10 | 3-0240 | P11 | 0.2 Develop 20% | | ...  ... |
| 10 | Alice | Brazil | Company11 | 3-0241 | P03 | 0.4 Solution 40% | | + Insert PivotTable  Help? |
| 11 | Alice | US | Company12 | 3-0242 | P04 | 0.8 Close 81% | | 'Revenue-Sold' by 'Country', 'Pursuit Lead' |
| 12 | Callie | US | Company13 | 3-0243 | P02 | 0.4 Solution 40% | | Sum of Revenue–Sold  Column Lab... |
| 13 | Bob | US | Company14 | 3-0244 | P01 | 0.00 Disengaged 0% | | Row Labels  Argentina B... |
| 14 | Jennifer | Canada | Company15 | 3-0245 | P06 | 0.00 Disengaged 0% | | Alice  $125,441 $... |
| 15 | Jennifer | Canada | Company16 | 3-0246 | P02 | 0.8 Close 81% | | Bob |
| 16 | Bob | US | Company20 | 3-0250 | P06 | 0.00 Disengaged 0% | | Callie  403 |
| 17 | Alice | US | Company21 | 3-0251 | P03 | 0.00 Disengaged 0% | | Jennifer |
| 18 | Bob | Brazil | Company22 | 3-0252 | P05 | 0.2 Develop 20% | | Grand Total  $125,441 |
| 16 | Bob | US | Company20 | 3-0250 | P06 | 0.00 Disengaged 0% | | + Insert PivotTable  Help? |
| 17 | Alice | US | Company21 | 3-0251 | P03 | 0.00 Disengaged 0% | | 'Revenue-Sold' by 'Country', 'Period' |
| 18 | Alice | Brazil | Company22 | 3-0252 | P05 | 0.2 Develop 20% | | Sum of Revenue–Sold  Column Lab... |
| | | | | | | | | Row Labels  Argentina B... |
| | | | | | | | | P07  $... |
| | | | | | | | | P09  405 |
| | | | | | | | | P06 |
| | | | | | | | | P04  $- |

FIGURE 4

| | A | B | C | D | E | F |
|---|---|---|---|---|---|---|
| 1 | Year | Category | Product | Sales | Rating | |
| 2 | 2017 | Component | Chains | $20,000 | 75% | |
| 3 | 2015 | Clothing | Socks | $3,700 | 22% | |
| 4 | 2017 | Clothing | Bib-Shorts | $4,000 | 22% | |
| 5 | 2015 | Clothing | Shorts | $13,300 | 56% | |
| 6 | 2017 | Clothing | Tights | $36,000 | 100% | |
| 7 | 2015 | Component | Handlebars | $2,300 | 35% | |
| 8 | 2016 | Clothing | Socks | $2,300 | 28% | |
| 9 | 2016 | Component | Brakes | $3,400 | 36% | |
| 10 | 2016 | Bikes | Mountain Bikes | $6,300 | 40% | |
| 11 | 2017 | Component | Brakes | $5,400 | 38% | |
| 12 | 2016 | Accessories | Helmets | $17,000 | 90% | |
| 13 | 2016 | Accessories | Lights | $21,600 | 90% | |
| 14 | 2016 | Accessories | Locks | $29,800 | 90% | |
| 15 | 2016 | Component | Bottom Bracket | $1,000 | 23% | |
| 16 | 2015 | Clothing | Jerseys | $6,700 | 5% | |
| 17 | 2017 | Component | Bottom Bracket | $600 | 27% | |
| 18 | 2015 | Bikes | Road Bikes | $3,500 | 50% | |
| 16 | 2017 | Clothing | Jerseys | $7,500 | 40% | |
| 17 | 2017 | Accessories | Tires and Tubes | $63,700 | 90% | |
| 18 | 2017 | Bikes | Cargo Bike | $9,300 | 60% | |

701

Category
Accessories
Bikes
Clothing
Components

Recently Used Actions

TIME (hour,minute,second)
Ideas
Bold

Suggested Questions

Sort 'Product' by total 'Sales'
Percentage of total 'Sales' for each 'Categ...
Show total 'Sales' by 'Year' as a line chart

Suggested Actions

Font Size  703
Font
Format Cells

Recent Searches

"how do I refresh my pivot table"
"find average in excel"
"change theme for pivottable"

People

Mar Gines Marin
PRINCIPAL PROGRAM MANAGER

Sudhi Ramamurthy
SENIOR PROGRAM MANAGER

Files

Team Delta Working Sessions.xls
Excel PM Team Delta > Shared Documents
Excel Online Extensibility Status.xls
Microsoft > personal > suraman-microsoft

FIGURE 7

```
Export interface IExcelRecognizedTableField {
    readonly classification: ExcelRecognizedTableFieldClassification;
    readonly aggregations: ExcelRecognizedTableFieldAggregation[];
    readonly headerReferences: IExcelRecognizedTableCellReference[];
}

Export interface IExcelRecognizedTableInterpretation {
    readonly confidence: number;
    readonly location: IExcelRangeAddress;
    readonly orientation: ExcelRecognizedTableOrientation;    ~ 901
    readonly headerRowCount: number;
    readonly headerColumnCount: number;
    readonly fields: IExcelRecognizedTableField[];
}

Export interface IExcelRecognizedTable extends IAnnotation {
    // The range in which the table is detected
    readonly range: IExcelRangeAddress;

// One or more interpretations of the table structure within the range
    readonly interpreations: IExcelRecognizedTableInterpretation[];
}
```

| Year | Product | Sales (m) | |
|------|---------|-----|--------|
|      |         | USA | Canada |
| 2015 | Apples  | 14.5 | 3.9 |
| 2015 | Bananas | 8 | 2.5 |
| 2015 | Oranges | 11 | 3.5 |
| 2016 | Apples  | 13.2 | 5.1 |
| 2016 | Bananas | 9.4 | 3.3 |
| 2016 | Oranges | 10.5 | 10 |
| 2017 | Apples  | 11.8 | 12.5 |
| 2017 | Bananas | 9.5 | 2.1 |
| 2017 | Oranges | 12.2 | 4.2 |
|      |         | 100.1 | 47.1 |

```
Confidence: 0.98
Location: A1:D11
Orientation: Column Major
Header Rows: 2
Header Columns: 0
Fields: [
  {
    Classification: Dimension
    Header References: [ A2 ]
    Data Type: Year
  },
  {
    Classification: Measure
    Header References: [ C1, C2 ]
    Data Type: Number
    Aggregations: [
      Sum, Min, Max, Avg
    ]
  }
]
```

FIGURE 11

|   | A | B | C | D | E | F |
|---|---|---|---|---|---|---|
| 1 |   |   |   |   |   |   |
| 2 |   |   |   |   |   |   |
| 3 |   | Grid context | Value |   |   |   |
| 4 |   | Height | 7 |   |   |   |
| 5 |   | Width | 56 |   |   |   |
| 6 |   | NeighborHeight | 15 |   |   |   |
| 7 |   | NeighborWidth | 12 |   |   |   |
| 8 |   | TargetColumn | 27 |   |   |   |
| 9 |   |   |   |   |   |   |
| 10 |   |   |   |   |   |   |
| 11 |   |   |   |   |   |   |
| 12 |   |   |   |   |   |   |

1200

1201

```
{
  "recognizedtable": {
    "address": {
      "range": {"top": 3, "bottom": 8, "left": 2, "right": 3}
    },
    "interpretations": [
      {
        "confidence": 0.75,
        "tablelocation": {"top": 3, "bottom": 8, "left": 2, "right": 3},
        "headercolumncount": 0,
        "orientation": "columnmajor",
        "fields": [
          {
            "classification": "dimension",
            "headerreferences": {"top": 3, "left": 2}
          },
          {
            "classification": "measure",
            "aggregationTypes": ["sum"],
            "headerreferences": {"top": 3, "left": 3}
          }
        ]
      },
      {
        "confidence": 0.25,
        "tablelocation": {"top": 3, "bottom": 8, "left": 2, "right": 3},
        "headerrowcount": 0,
        "headercolumncount": 1,
        "orientation": "rowmajor",
        "fields": [
          {
            "classification": "dimension",
            "headerreferences": {"top": 3, "left": 2}
          },
          {
            "classification": "measure",
            "aggregationTypes": ["sum"],
            "headerreferences": {"top": 4, "left": 3}
          },
          {
            "classification": "measure",
            "aggregationTypes": ["sum"]
          }
        ]
      }
    ]
  }
}
```

| Product | Jeans | Shirts | Hats | Aprons |
|---|---|---|---|---|
| 2015 | 3002 | 1541 | 6228 | 83 |
| 2016 | 5487 | 2264 | 5475 | 110 |
| 2017 | 7402 | 2169 | 5809 | 108 |
| Cost | £ 13.00 | £ 4.00 | £ 3.00 | £ 5.00 |
| Price | £ 54.00 | £ 16.00 | £ 8.00 | £ 25.00 |

FIGURE 18

Row Major Orientation

| | A | B | C | D | E | F | G | H |
|---|---|---|---|---|---|---|---|---|
| 1 | | | | | | | | |
| 2 | | | Product | Jeans | Shirts | Hats | Aprons | |
| 3 | | | 2015 | 3002 | 1541 | 6228 | 83 | |
| 4 | | | 2016 | 5487 | 2264 | 5475 | 110 | |
| 5 | | | 2017 | 7402 | 2169 | 5809 | 108 | |
| 6 | | | Sold | | | | | |
| 7 | | | Cost | £ 13.00 | £ 4.00 | £ 3.00 | £ 5.00 | |
| 8 | | | Price | £ 54.00 | £ 16.00 | £ 8.00 | £ 25.00 | |
| 9 | | | | | | | | |

1705 — Headers
1703 / 1707 — Values

|   | A | B | C | D | E | F | G | H |
|---|---|---|---|---|---|---|---|---|
| 1 |   |   |   |   |   |   |   |   |
| 2 |   |   |   |   |   |   |   |   |
| 3 |   |   | Product | Jeans | Shirts | Hats | Aprons |   |
| 4 |   |   | 2015 | 3002 | 1541 | 6228 | 83 |   |
| 5 |   |   | 2016 | 5487 | 2264 | 5475 | 110 |   |
| 6 |   |   | 2017 | 7402 | 2169 | 5809 | 108 |   |
| 7 |   | Sold |   |   |   |   |   |   |
| 8 |   |   | Cost | £ 13.00 | £ 4.00 | £ 3.00 | £ 5.00 |   |
| 9 |   |   | Price | £ 54.00 | £ 16.00 | £ 8.00 | £ 25.00 |   |
| 10 |   |   |   |   |   |   |   |   |

Classification: Dimension (categorical)

Classification: Measure
Recommended aggregation: Sum

| | A | B | C | D | E |
|---|---|---|---|---|---|
| 1 | | | | | |
| 2 | Table 15. Family Households by Size, Type, and Age of Householder: 2011 | | | | |
| 3 | (Numbers in thousands. Civilian noninstitutionalized population | | | | |
| 4 | | | | | Large Size | |
| 5 | Type and age of householder | Two people | Three people | Four people | Five or more people |
| 6 | | | | | | |
| 7 | Male householder | 2,204 | 1,714 | 895 | 746 |
| 8 | 15 to 19 years | 37 | 71 | 65 | 58 |
| 9 | 20 to 24 years | 171 | 198 | 123 | 101 |
| 10 | 25 to 29 years | 159 | 206 | 161 | 98 |
| 11 | 30 to 34 years | 202 | 199 | 114 | 96 |
| 12 | 35 to 39 years | 194 | 163 | 113 | 102 |
| 13 | 40 to 44 years | 177 | 211 | 84 | 98 |
| 14 | 45 to 49 years | 257 | 189 | 77 | 62 |
| 15 | 50 to 54 years | 274 | 195 | 55 | 41 |
| 16 | 55 to 59 years | 222 | 97 | 33 | 22 |
| 17 | | | | | |
| 18 | Female householder | 5,979 | 4,555 | 2,567 | 1,920 |
| 19 | 15 to 19 years | 49 | 85 | 55 | 69 |
| 20 | 20 to 24 years | 376 | 415 | 192 | 173 |
| 21 | 25 to 29 years | 471 | 512 | 364 | 238 |
| 22 | 30 to 34 years | 441 | 560 | 376 | 319 |
| 23 | 35 to 39 years | 469 | 584 | 429 | 301 |
| 24 | 40 to 44 years | 571 | 597 | 324 | 208 |
| 25 | 45 to 49 years | 693 | 596 | 295 | 158 |
| 26 | 50 to 54 years | 668 | 399 | 169 | 157 |
| 27 | 55 to 59 years | 543 | 221 | 110 | 99 |
| 28 | | | | | |
| 29 | | | | | |
| 30 | SOURCE: U.S. Census Bureau, Current Population Survey, Annual | | | | |
| 31 | Internet release date: November 2012 | | | | |
| 32 | | | | | |

FIGURE 22

|   | A | B | C | D | E |
|---|---|---|---|---|---|
| 1 |   |   |   |   |   |
| 2 | Table 15. Family Households by Size, Type, and Age of Householder: 2011 | | | | |
| 3 | (Numbers in thousands. Civilian noninstitutionalized population | | | | |
| 4 |   |   |   |   | Large Size |
| 5 | Type and age of householder | Two people | Three people | Four people | Five or more people |
| 6 | Male householder | 2,204 | 1,714 | 895 | 746 |
| 7 | 15 to 19 years | 37 | 71 | 65 | 58 |
| 8 | 20 to 24 years | 171 | 198 | 123 | 101 |
| 9 | 25 to 29 years | 159 | 206 | 161 | 98 |
| 10 | 30 to 34 years | 202 | 199 | 114 | 96 |
| 11 | 35 to 39 years | 194 | 163 | 113 | 102 |
| 12 | 40 to 44 years | 177 | 211 | 84 | 98 |
| 13 | 45 to 49 years | 257 | 189 | 77 | 62 |
| 14 | 50 to 54 years | 274 | 195 | 55 | 41 |
| 15 | 55 to 59 years | 222 | 97 | 33 | 22 |
| 16 |   |   |   |   |   |
| 17 | Female householder | 5,979 | 4,555 | 2,567 | 1,920 |
| 18 | 15 to 19 years | 49 | 85 | 55 | 69 |
| 19 | 20 to 24 years | 376 | 415 | 192 | 173 |
| 20 | 25 to 29 years | 471 | 512 | 364 | 238 |
| 21 | 30 to 34 years | 441 | 560 | 376 | 319 |
| 22 | 35 to 39 years | 469 | 584 | 429 | 301 |
| 23 | 40 to 44 years | 571 | 597 | 324 | 208 |
| 24 | 45 to 49 years | 693 | 596 | 295 | 158 |
| 25 | 50 to 54 years | 668 | 399 | 169 | 157 |
| 26 | 55 to 59 years | 543 | 221 | 110 | 99 |
| 27 |   |   |   |   |   |
| 28 |   |   |   |   |   |
| 29 | SOURCE: U.S. Census Bureau, Current Population Survey, Annual | | | | |
| 30 | Internet release date: November 2012 | | | | |
| 31 |   |   |   |   |   |

FIGURE 23

| Rank | Building | City | Country | Height (m) | Height (ft) | Floors | Year Built | Link to Wikipedia page |
|---|---|---|---|---|---|---|---|---|
| 1 | Taipei 101 | Taipei | jh3m-kjja | 509 | 1671 | 101 | 2004 | ["http://en.wikipedia.org |
| 2 | Shanghai | Shanghai | gviq-w96 | 492 | 1614 | 101 | 2008 | ["http://en.wikipedia.org |
| 3 | Petronas T | Kula Lum | ih9r-5h9f | 452 | 1483 | 88 | 1998 | ["http://en.wikipedia.org |
| 4 | Petronas T | Kula Lum | ih9r-5h9f | 452 | 1483 | 88 | 1998 | ["http://en.wikipedia.org |
| 5 | Sears Tow | Chicago | rb9f-7f48 | 442 | 1451 | 108 | 1973 | ["http://en.wikipedia.org |
| 6 | Jin Mao T | Shanghi | gviq-w96 | 421 | 1380 | 88 | 1998 | ["http://en.wikipedia.org |
| 7 | Two Inter | Hongon | 3gsp-ds3g | 415 | 1362 | 88 | 2003 | ["http://en.wikipedia.org |
| 8 | CITIC Plaza | Guangzh | gviq-w96q | 391 | 1283 | 80 | 1997 | ["http://en.wikipedia.org |
| 9 | Shun Hing | Shenzhe | gviq-w96q | 384 | 1260 | 69 | 1996 | ["http://en.wikipedia.org |
| 10 | Empire St | New Yor | rb9f-7f48 | 381 | 1250 | 102 | 1931 | ["http://en.wikipedia.org |
| 11 | Central Pla | Hong Ko | 3gsp-ds3g | 374 | 1227 | 78 | 1992 | ["http://en.wikipedia.org |
| 12 | Bank of Ch | Hong Ko | 3gsp-ds3g | 367 | 1205 | 72 | 1990 | ["http://en.wikipedia.org |
| 13 | Bank of A | New Yor | rb9f-7f48 | 366 | 1200 | 54 | 2008 | ["http://en.wikipedia.org |
| 14 | Almas To | Dubai | 8sdr-wy6p | 360 | 1181 | 74 | 2008 | ["http://en.wikipedia.org |
| 15 | Emirates | Dubai | 8sdr-wy6p | 355 | 1163 | 54 | 2000 | ["http://en.wikipedia.org |
| 16 | Tuntex Sk | Kaohsiun | jh3m-kjja | 348 | 1140 | 85 | 1997 | ["http://en.wikipedia.org |
| 17 | Aon Cente | Chicago | rb9f-7f48 | 346 | 1136 | 83 | 1973 | ["http://en.wikipedia.org |

FIGURE 25

DISCOVERY AND SUGGESTIONS FOR UNSTRUCTURED TABLES IN SPREADSHEETS

TECHNICAL FIELD

Aspects of the disclosure are related to the field of computer software applications and, in particular, to spreadsheet applications and associated technology.

BACKGROUND

Spreadsheet applications are powerful tools for interacting with data of all types. Familiar features of spreadsheet applications include the ability to sort and tabulate data, to generate charts and pivot tables for analyzing data, and to create formulas that automatically calculate values based on the contents of other cells.

Some spreadsheet applications use cloud-based artificial intelligence and machine learning to discover and reveal patterns that a user may have overlooked. To apply such features, a user first highlights the data of interest (such as a table) and then clicks on a button that launches the feature with respect to the highlighted data.

The spreadsheet application provides the feature by sending the highlighted data to the cloud, to be analyzed by a remote service. The service returns various suggestions to the application to be displayed in its user interface, such as a recommended chart or pivot table.

OVERVIEW

Technology is disclosed herein that improves usability and performance of spreadsheet applications. In an implementation, an application on a computing device displays a spreadsheet in a user interface that includes one or more unstructured tables. The application sends data from its cell grid to a service to be analyzed, without a user having to highlight or otherwise select the unstructured tables beforehand. Instead, the service is able to discover the tables and provides the application with metadata indicative of their presence in the spreadsheet.

As the user works in the spreadsheet, the application is able to detect user actions associated with one of the unstructured tables, in response to which it displays a suggestion component for previewing recommended features such as a pivot table for the unstructured table. The user can then preview and deploy the recommended feature(s) with ease. In the same or other implementations, the application may respond to events other than user actions, and its response(s) may also vary, non-limiting examples of which are provided in more detail below.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

FIG. 4 illustrates a view produced by an application in an implementation.

FIG. 7 illustrates a view produced by an application in an implementation.

FIG. 9 illustrates a table annotation in an implementation.

FIG. 11 illustrates an exemplary scenario in an implementation.

FIG. 12 illustrates another exemplary scenario in an implementation.

FIGS. 17-21 illustrate an exemplary table in an implementation.

FIGS. 22-23 illustrate an exemplary table in an implementation.

FIG. 25 illustrates an exemplary table in an implementation.

DETAILED DESCRIPTION

Figure 1:
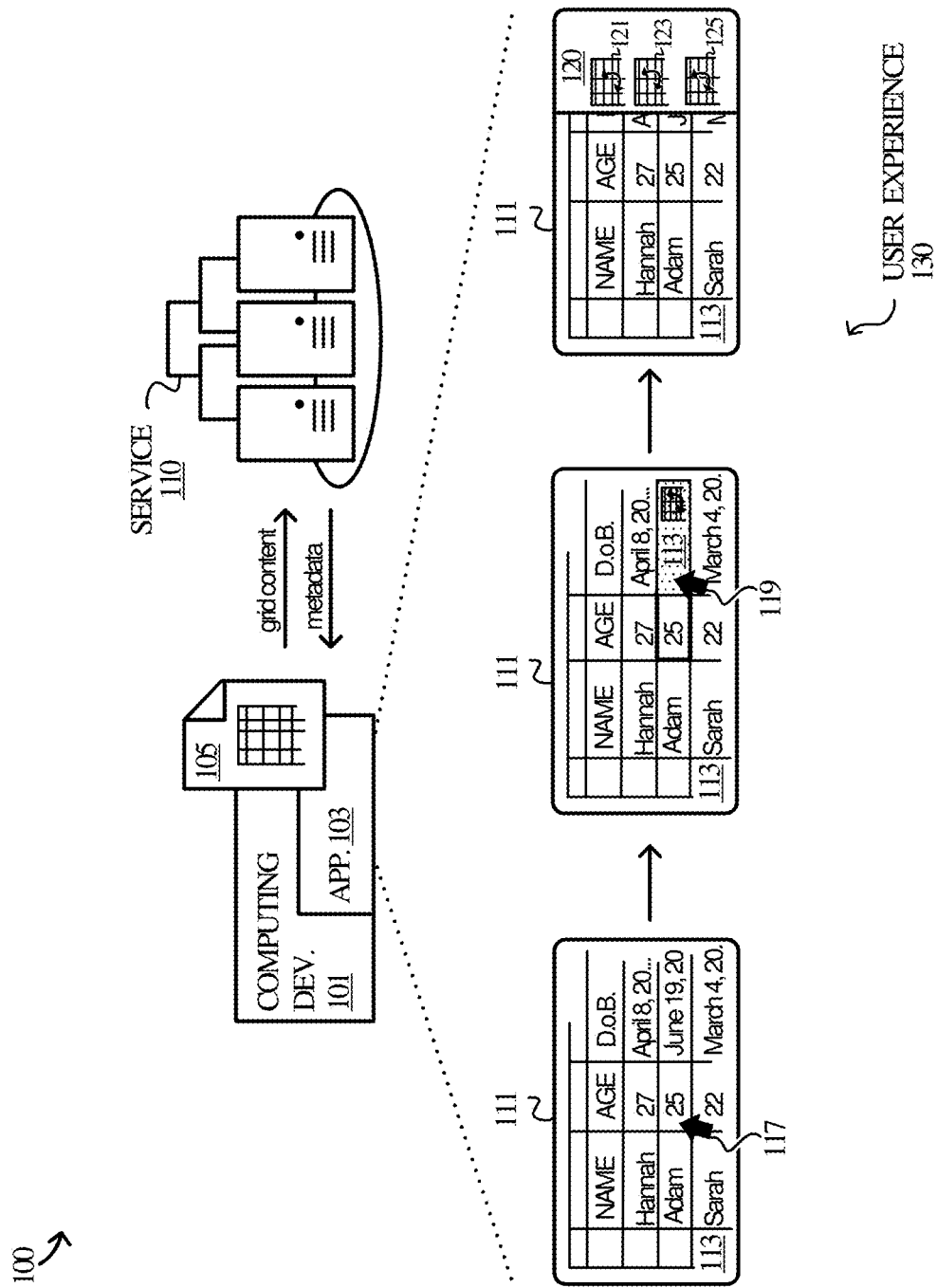
FIG. 1 illustrates an operational environment in an implementation.

Various implementations are disclosed herein that provide for the automatic discovery of tables in spreadsheets, as well as for suggestions and recommendations related thereto. In an implementation, a computing device under the control of a spreadsheet application displays a spreadsheet in a user interface. The application detects a user action in the spreadsheet associated with an unstructured table and responsively drives the computer to display a suggestion component in the user interface. A selection of the component causes the computer to display a preview of a suggested table feature in the user interface.

In some implementations, the application also maintains metadata associated with the spreadsheet. The metadata identifies, for example, one or more unstructured tables in the spreadsheet. The application monitor user actions in the spreadsheet for those associated with the one or more unstructured tables and responsively displays the suggestion component as discussed above.

The spreadsheet includes a cell grid defined by columns and rows. Each of the unstructured tables includes a subset of cells within the cell grid defined by a subset of the columns and rows. Each table encompasses less than an entirety of the cell grid, and none of the unstructured tables are formatted as a table, meaning that they are not explicitly structured as a table. It may be appreciated that the sheet may include other tables that are explicitly structured as tables, which may also be described by the metadata.

Examples of user actions include selections of single cells, such as when a user lands on, edits, or otherwise interacts with a single cell such that it is the active cell in the sheet. Other examples include selections of groups of cells and sorting actions, such as when a user selects multiple rows of cells and attempts to sort them.

The spreadsheet application may obtain the metadata from a microservice remote from the computing device. Moreover, the application generates the one or more previews based at least on a portion of the metadata. For example, the metadata may describe the dimensions of a table and parameters for one or more pivot tables. The application can generate the preview based on such information.

To obtain the metadata from the service, the application sends content from a superset of cells in the cell grid to the microservice. The superset of cells may include the subset of the cells and other cells in the cell grid. In some implementations, the application sends the contents of the entire cell grid. In other implementations, the application splits the grid into parts and sends the grid one part at a time. In still other implementations, the application may filter the grid such that only a portion of the grid is sent.

In each of the aforementioned cases, various technical effects may be evident and appreciated. For example, the application sends the grid content without knowing beforehand which group(s) of cells could potentially be a table. That is, the grid content is sent to the service without the user having to select or otherwise identify a group of cells as a table. Rather, the service processes the grid contents to determine which cell group(s) may be tables.

Moreover, the service analyzes the potential groupings to develop the metadata that it returns to the application, which allows the application can then store the metadata and reference it at runtime to provide recommendations and suggestions to the user. Such aspects provide the technical effect of providing the local application with the metadata so that the resulting suggestions and recommendations can be provided quickly and efficiently. Example recommendations of table features include suggested pivot tables generated from at least a portion of the unstructured tables discovered by the service. Other examples include suggested cards views, as well as natural language content and understanding.

Other use cases may arise any time other spreadsheet features interact with the grid data, and their behavior may be improved by knowledge of the detected table structures. For example, a user may insert a chart and place the cursor on a detected table structure. The spreadsheet application, having knowledge of the workbook's implicit table structures, can leverage the knowledge when setting up the chart's data source(s). In another example, an accessibility checker, by knowledge of the workbook's implicit table structures, may determine when a merged cell was appropriate compared to when it was an accessibility problem. Previously, features that required such intelligence ran their own analysis on-demand, rather than being able to reference common pre-generated metadata that is immediately available.

Figure 28:
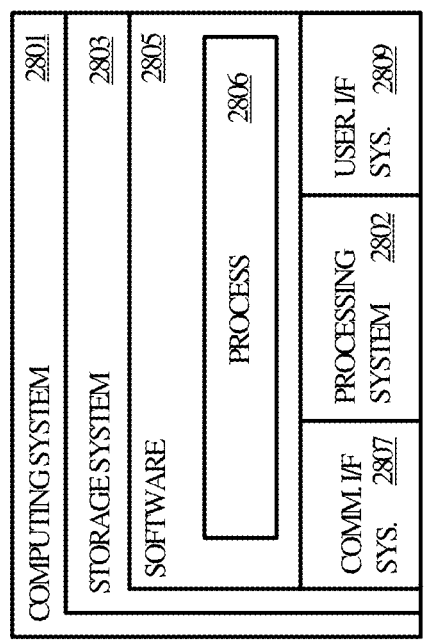
FIG. 28 illustrates a computing system suitable for implementing the various operational environments, architectures, processes, scenarios, and sequences discussed below with respect to the other Figures.

FIG. 1 illustrates operational environment 100 in an implementation. Operational environment 100 includes computing device 101 and online service 110. Computing device 101 includes one or more software applications, of which application 103 is representative, capable of providing a user experience 130 with respect to a spreadsheet workbook (workbook 105). The user experience 130 produced by computing device 101 includes a user interface 111 through which a user may interact with and otherwise experience a spreadsheet 113 from workbook 105. Examples of computing device 101 include personal computers, tablet computers, mobile phones, and any other suitable devices, of which computing device 2801 in FIG. 28 is broadly representative.

Application 103 is representative of any software application in which a user can open and edit a spreadsheet, which may be contained in a spreadsheet workbook, a word processing document, a digital notebook, an email, or any other type of file. Examples of application 103 include—but are not limited to—spreadsheet applications, word processing applications, digital notebook applications, and email applications. Application 103 may be a natively installed and executed application, a browser-based application, a mobile application, or any other application suitable for experiencing spreadsheets, tables, and the like. Application 103 may execute in a stand-alone manner (as in the case of a natively installed application) or within the context of another application (as in the case of a browser-based application), or in some other manner entirely.

Online service 110 provides one or more computing services to end points such as computing device 101. For example, online service 110 may provide an augmentation service to application 103. The augmentation service may be provided as a stateless microservice in some implementations. In the same or other implementations, the augmentation service may be implemented in association with—or in the context of—an insights service. The insights service may provide, for example, insights with respect to a table or tables in a spreadsheet, whereas the augmentation service (or microservice) auto-discovers said table or tables and provides metadata to application 103 indicative of the table(s).

Online service 110 employs one or more server computers to provide augmentation and insights services to application 103. The servers may be co-located with respect to each other or distributed across one or more data centers connected to computing device 101. Examples of such servers include web servers, application servers, virtual or physical (bare metal) servers, or any combination or variation thereof, of which computing device 2801 in FIG. 28 is broadly representative. Computing device 101 may communicate with online service 110 via one or more internets and intranets, the Internet, wired and wireless networks, local area networks (LANs), wide area networks (WANs), and any other type of network or combination thereof.

Figure 2:
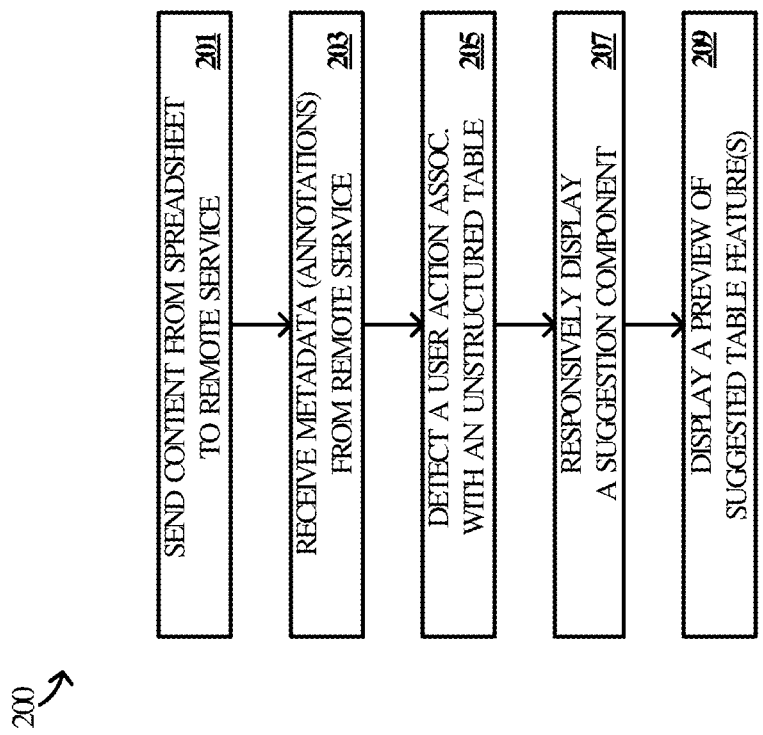
FIG. 2 illustrates a view produced by an application in an implementation.

FIG. 2 illustrates an augmentation process 200 in an implementation. Augmentation process 200 may be implemented in program instructions in the context of any of the software applications, modules, components, or other such elements of one or more computing devices such as application 103 on computing device 101. The program instructions direct the computing device(s) to operate as follows, referred to in the singular for the sake of clarity and parenthetically with respect to the steps in FIG. 2.

In operation, the computing device sends content from a spreadsheet to a remote service (step 201). The content includes the values of cells in all or a portion of the spreadsheet. In some implementations, the content is sent in multiple steps by splitting the spreadsheet into parts and iteratively sending the content from each part to the service. The content may be drawn from the entirety of the cell grid in the spreadsheet or from less then the entirety of the cells. However, it may be appreciated that content includes at least a subset of the cells that hold an unstructured table. That is, the cells are not formatted as a table, meaning that the spreadsheet does not yet recognize the cells as a table. The content also includes a superset of cells that includes the subset of cells and other cells. The device may send the content upon opening the spreadsheet, upon content changing in the spreadsheet, or in response to a variety of other triggers. Notably, the content is sent to the service and analyzed in advance of subsequent user actions that discussed below with respect to Step 205.

The service receives the content and analyzes it to discover any unstructured tables that may be present in the content. It is assumed for exemplary purposes that service discovers the unstructured table. The service may also identify various aspects of the unstructured table that may be applicable downstream, such as whether the table could support a pivot table (pivotable), certain columns that belong together, and entity types for the columns. The service returns metadata to computing devices that identifies the unstructured table. The metadata may also identify or otherwise include information descriptive of aspects or characteristics of the table such as its headers, header orientation and structure, table dimensions, and field statistics of the table.

The computing device receives the metadata from the service (step 203) and proceeds to monitor for user actions associated with any of the tables identified in the metadata. For example, the computing device may identify the active cell associated with a user action and then determine whether the active cell is part of a table identified in the metadata. Assuming the computer detects one such user action associated with an unstructured table (step 205), the computer proceeds to display a suggestion component indicative that one or more recommended features may be available with respect to the table (step 207).

The user can select the component, which causes the computer to display a preview of the suggested features (step 209). The preview(s) may include, for example, a preview of one or more pivot tables, a preview of a card view of the table, or a preview of any other table feature that may relate to the unstructured table. The user can select one or more of the recommended features in order to implement the feature in the spreadsheet. For instance, selecting a preview of a pivot table will cause the computer to produce the pivot table in the spreadsheet.

Referring back to FIG. 1, operational environment 100 includes a brief example of augmentation process 200 as employed by application 103 on computing device 101. In operation, application 103 causes computing device 101 to display user interface 111. User interface 111 includes a spreadsheet 113 having a cell grid defined by rows and columns. The grid includes a subset of cells that form an unstructured table.

In the background, application 103 directs computing device 103 to send grid content to online service 110. Online service 110 analyzes the content to identify any cells that may represent an unstructured table. Online service 110 generates and returns metadata to computing device 101 that identifies the unstructured tables, as well as other information about the tables. Application 103 receives the metadata and evaluates user actions against it to determine whether a given user action relates to one or more of the unstructured tables identified in the metadata.

In this example, user action 117 is a selection of one of the cells in one of the unstructured tables identified in the metadata. Accordingly, application 103 generates and surfaces a suggestion component 113 in user interface 111 to bring to the user's attention that tables features are available for enhancing the cell/cells with which they are working. The user can click-on or otherwise select the suggestion component 113 via another user action 119, which triggers application 103 to display a side panel 120 with various previews 121, 123, and 125 of the features. In this example, the previews are recommended pivot tables, although it may be appreciated that different features could be recommended and displayed. Selecting any of the previews would then cause application 103 to implement the feature in the spreadsheet.

Figure 3:
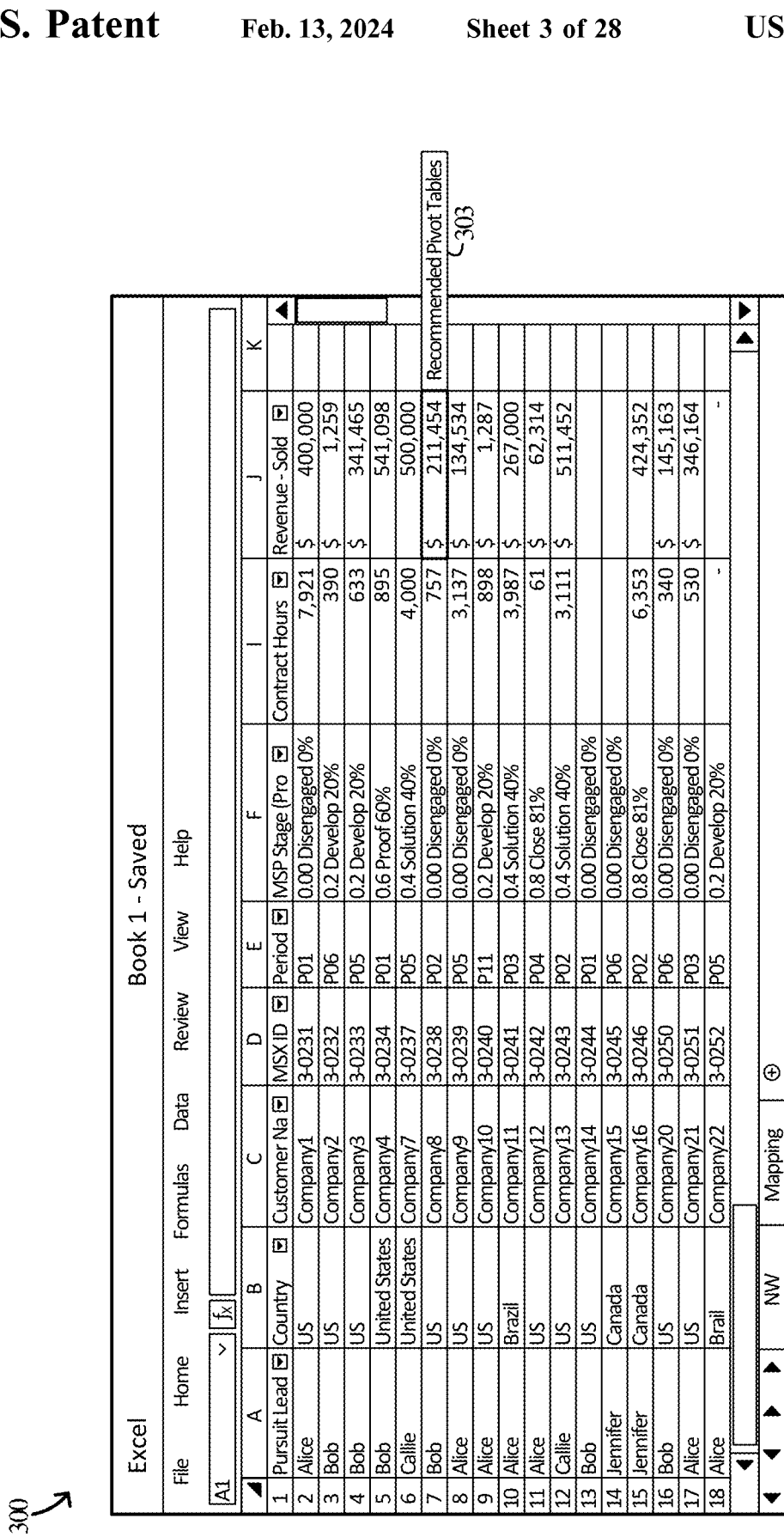
FIG. 3 illustrates a view produced by an application in an implementation.

FIG. 3 illustrates a view 300 of an exemplary spreadsheet 301 produced by a spreadsheet application in an implementation representative of the application of augmentation process 200. Note that view 300 includes a suggestion component 303 displayed alongside an active cell in the spreadsheet 301. Suggestion component 303 is surfaced by the application when a user action selects an active cell that falls within a range of cells discovered as belonging to an unstructured table.

FIG. 4 illustrates a view 400 of the same spreadsheet. View 400 is indicative of a view produced when the user selects suggestion component 303 in view 300. Selecting the component causes the application to display several recommended pivot tables 401, 403, and 405, any of which can be selected and employed in the spreadsheet.

Figure 5:
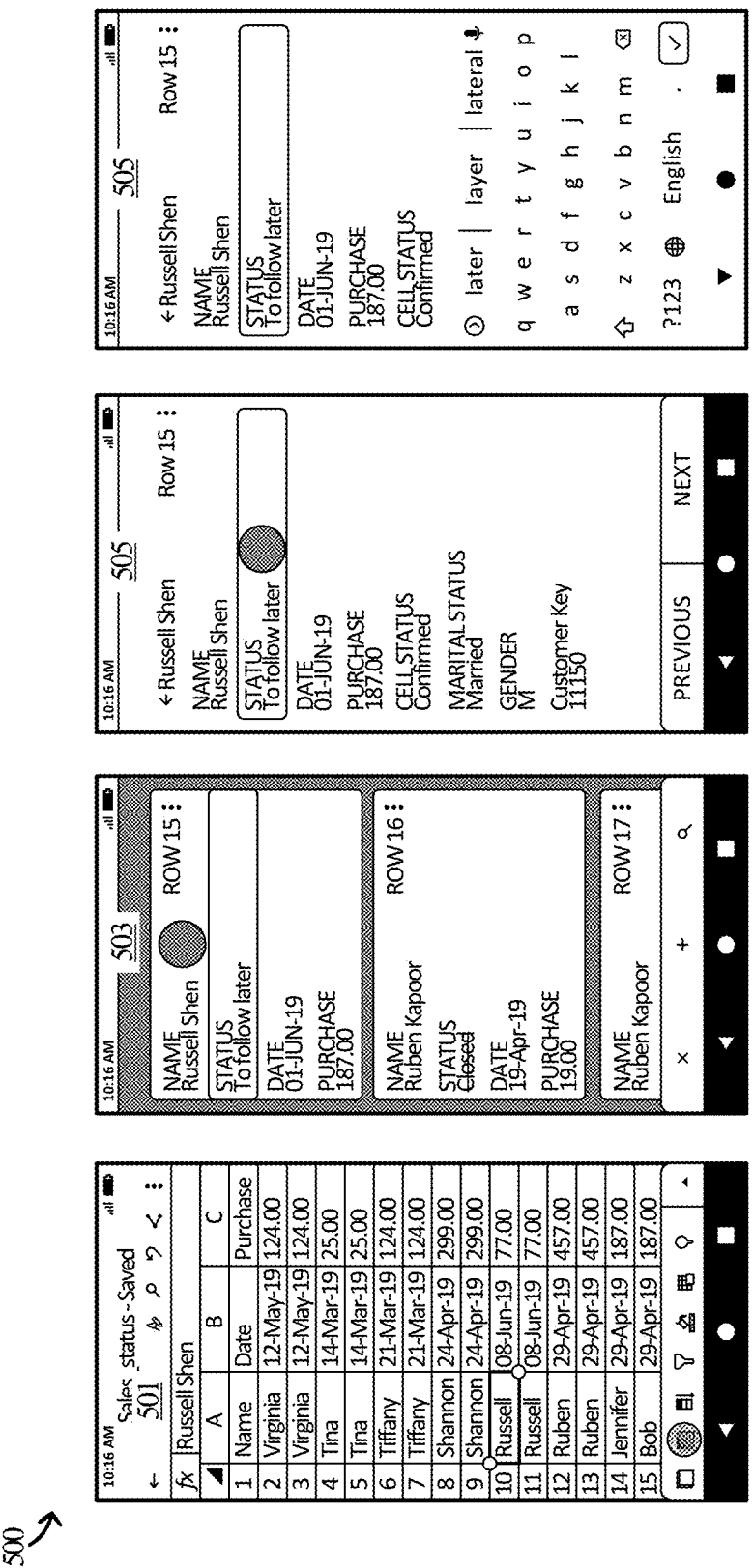
FIG. 5 illustrates a view produced by an application in an implementation.

FIG. 5 illustrates an operational scenario 500 indicative of operations that may be carried out when an augmentation process is employed on a mobile device or other such environment with limited screen space. In operational scenario 500, the device displays a view 501 of spreadsheet that includes data in cells forming an unstructured table. The user can click a button on the user interface to prompt the application to display suggested features for the cell and/or its surrounding cells. In a first step, the application determines whether the cell belongs to an unstructured table identified in metadata produced by a remote service/microservice.

Here, it is assumed that the active cell falls within an unstructured table. The application proceeds to surface a card view 503 of a row to which the active cell belongs. The card view includes various fields corresponding to the presumed headers of the unstructured table. The user can edit the data in the row through the fields of the cards in card view 503. The user can also click into a particular card to obtain a subsequent view 505 that provides a richer and/or fuller view of the data for a specific row. The user can edit the data and the edits are persisted to their corresponding cells in the spreadsheet.

Figure 6:
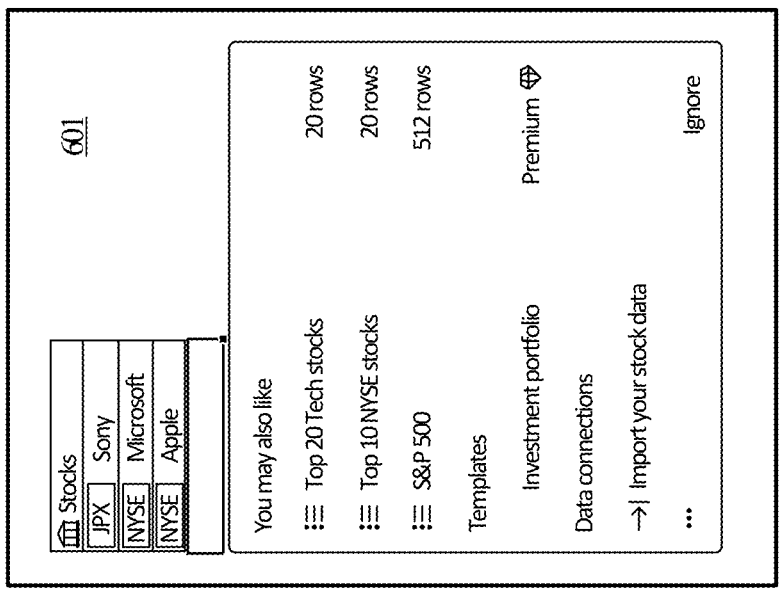
FIG. 6 illustrates a component produced by an application in an implementation.

FIG. 6 illustrates a view 600 of a suggestion component 601 in another implementation. Suggestion component 601 is representative of a component for displaying ideas and other such insights associated with an unstructured table.

FIG. 7 also illustrates view 700 of a spreadsheet having a structured table 701. View 700 also includes a sub-view 703 or panel that includes various suggestions for enhancing or otherwise interacting with the structured table 701, pivot tables, or other aspects of the spreadsheet.

Figure 8:
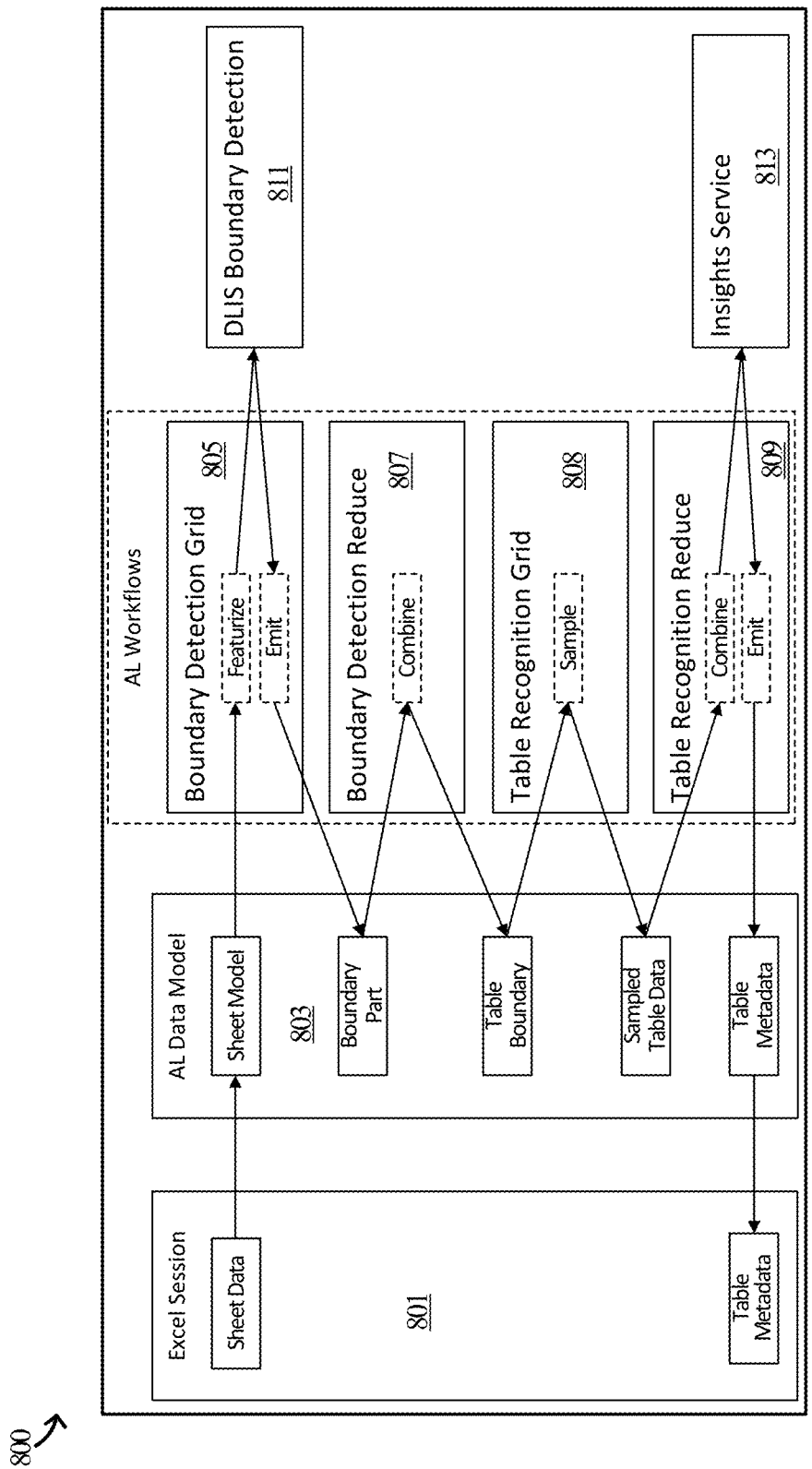
FIG. 8 illustrates an operational architecture in an implementation.

FIG. 8 illustrates an architecture 800 for implementing an augmentation process as contemplated herein. Architecture 800 includes a spreadsheet session 801 anchored by a spreadsheet application. The spreadsheet session 801 includes the local instance of a spreadsheet workbook opened by the application, including the sheet data for each of the sheets in the workbook. The spreadsheet session 801 also includes table metadata returned by the various other elements of architecture 800.

Sheet data is communicated from the spreadsheet session 801 to a data model 803. The data model represents an online model of the sheet hosted by spreadsheet session 801. Data model 803 passes sheet data to various workflows that operate on the data to produce the table metadata that is ultimately returned to the spreadsheet session 801. The data model 805 and workflows are implemented remotely from the spreadsheet session 801. The workflows include a boundary detection grid function 805 that determines the boundaries of any unstructured tables that may be present in the sheet data. (DLIS boundary detection function 811 may assist with this task.) A boundary reduction reduce function 807 reduces the scope of the sheet grid being considered. A table recognition grid function 808 performs the task of analyzing the sheet data to discover tables in the grid. A table recognition reduce function 809 further reduces the scope of the grid content that is passed to an insights service 813. The insights service 813 provides additional services and functionality, such as producing content recommendations (charts, pivot tables) to be provided to the spreadsheet session.

FIG. 9 illustrates a view 900 of a table annotation 901 produced by an augmentation service. Table annotation 901 is representative of the metadata that an augmentation service returns to a spreadsheet application. The application then references the metadata when evaluating user actions for their association with unstructured tables. The metadata may also be leveraged by the application when producing and displaying recommended table features and their previews.

Figure 10:
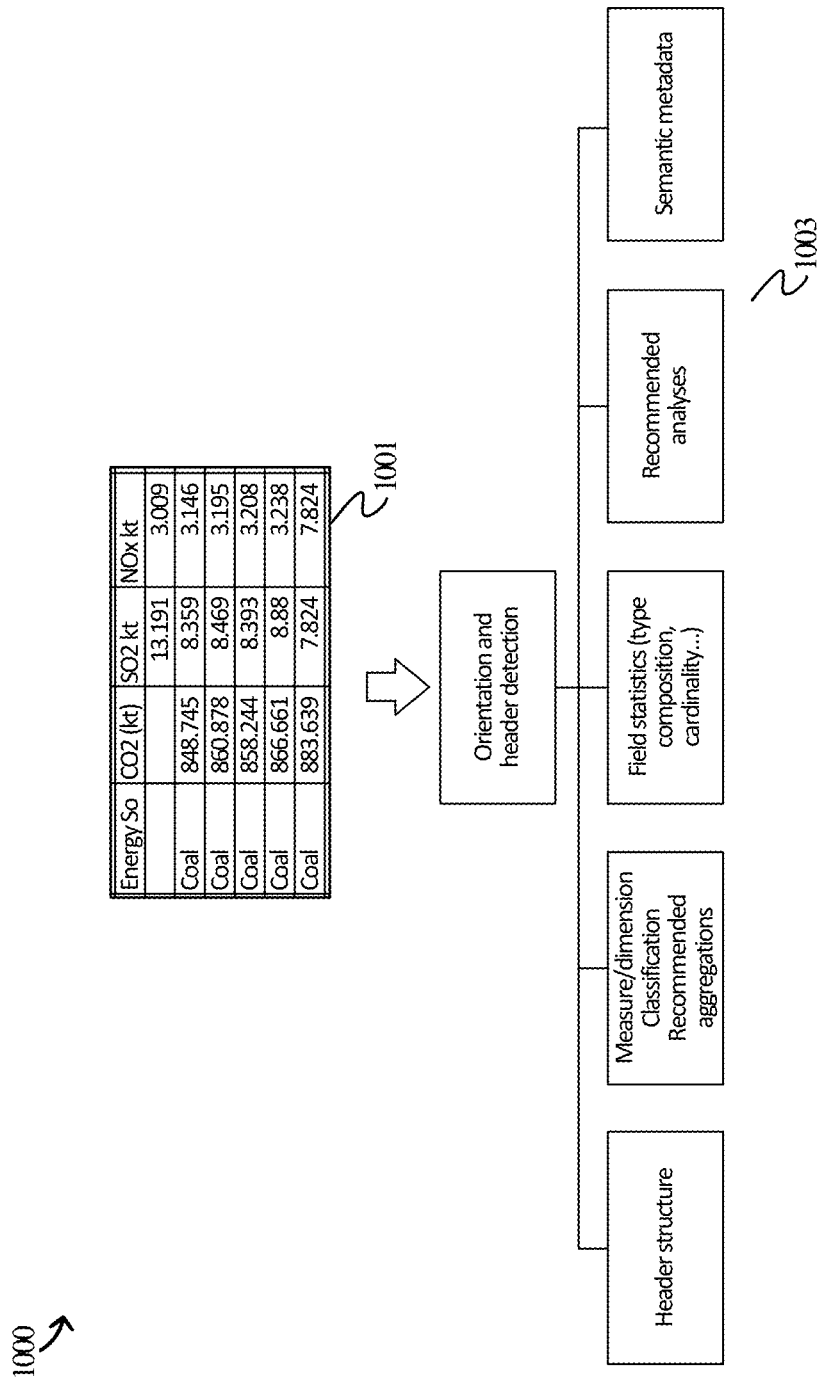
FIG. 10 illustrates representative metadata in an implementation.

FIG. 10 is a block diagram 1000 representing a spreadsheet 1001 and the different types of metadata 1003 that may be produced by an augmentation service. For example, the metadata includes data indicative of a table header and its orientation, a header structure, the measure and dimensions of the table, field statistics, recommended analysis, and semantic metadata.

FIG. 11 illustrates an operational example 1100 of an augmentation process. In this example, spreadsheet 1101 and its contents are the input to the augmentation process. The process generates metadata 1103, which is then leveraged to produce table feature recommendations and deployments.

FIG. 12 illustrates another operational example 1200 of an augmentation process. In this example, spreadsheet 1201 and its contents are the input to the augmentation process. The process generates metadata 1203, which is then leveraged to produce table feature recommendations and deployments.

Figure 13:
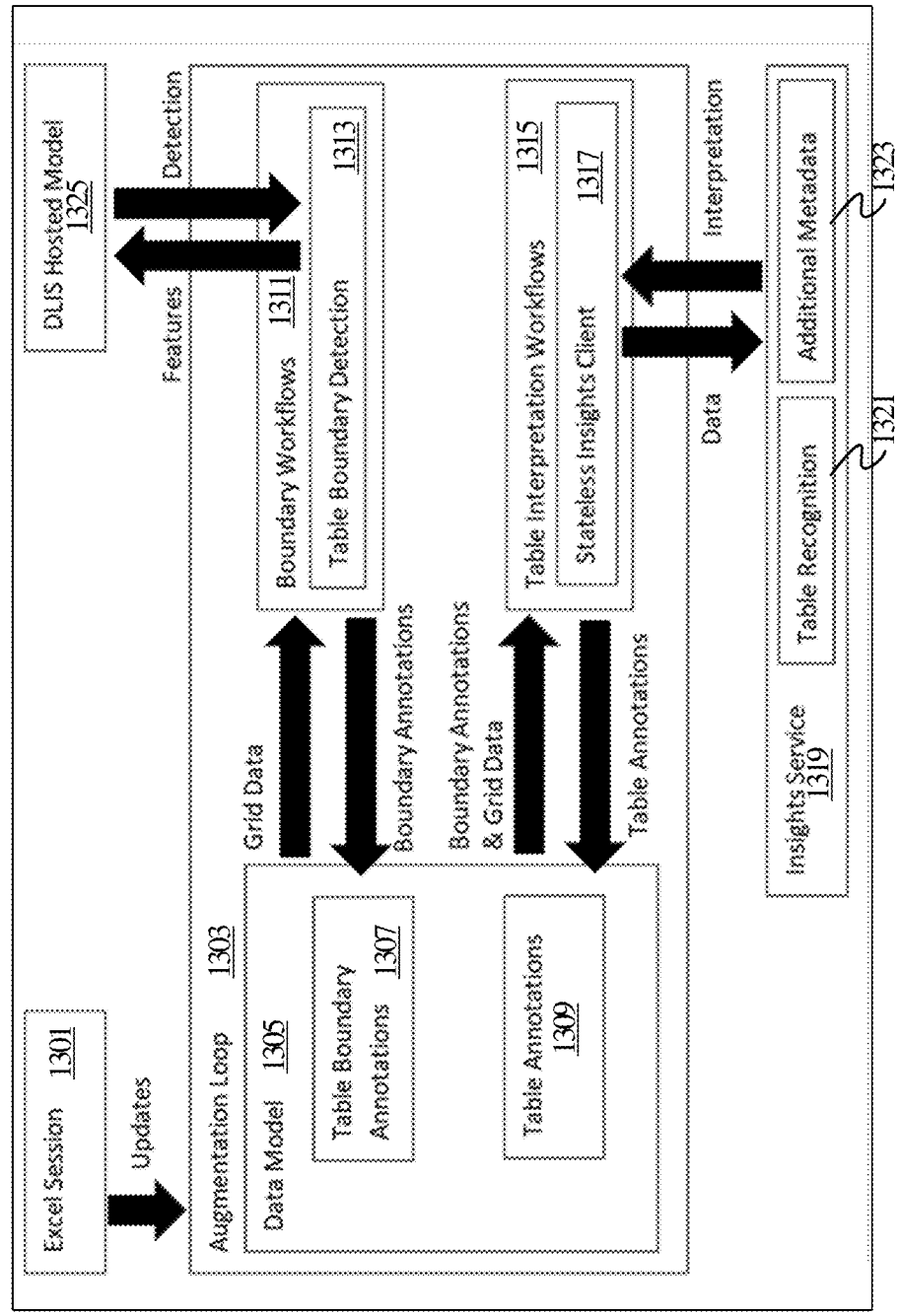
FIG. 13 illustrates an operational architecture in an implementation.

FIG. 13 illustrates an operational architecture 1300 for providing the spreadsheet augmentations contemplated herein. Operational architecture 1300 includes a spreadsheet session 1301 that provides content updates to an augmentation loop 1303. The augmentation loop 1303 includes a data model 1305 to which the updates are applied. The data model 1305 passes grid data to boundary workflows 1311, including a table boundary detection function 1313, which determine the boundaries of one or more unstructured tables in the grid data. Workflows 1311 and function 1313 may utilize the capabilities of hosted model 1325 (machine learning) to assist with the discovery of boundaries. Ultimately, table boundary annotations are returned to data model 1305.

Data model 1305 also includes a table annotations function 1309 that passes the boundary annotations and grid data to table interpretations workflows 1315. These workflows 1315 include a stateless insights client 1317 that produces table annotations. Client 1317 passes data to an insights service 1319, which produces table recognition data 1321 and metadata 1323, which may be returned by client 1317 to data model 1305.

In an exemplary sequence, a client in the context of spreadsheet session 1301 sends a grid data update to augmentation loop 1303. Augmentation loop 1303 triggers boundary detection workflows to process the new grid data. The boundary detection workflows featurize the new data and send it to a DLIS model. The returned detections are combined into table boundary annotations which are saved in the augmentation loop's data model. Table boundary annotations trigger table interpretation workflows, and table interpretation workflows send data for detected tables to insights service 1319. Insights service 1319 returns interpretations which are then added to the data model 1305 as table annotations.

Figure 14:
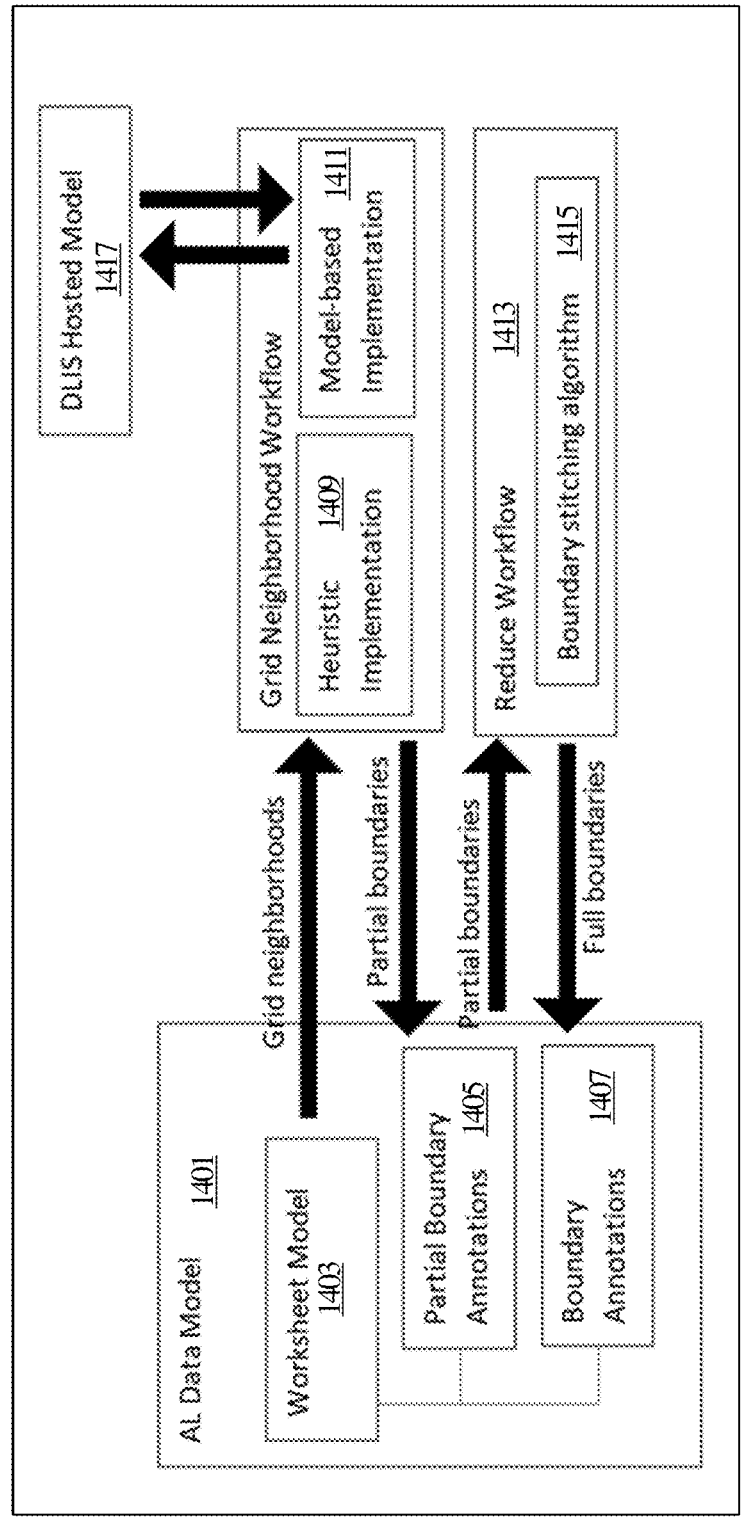
FIG. 14 illustrates an operational architecture in an implementation.

FIG. 14 illustrates another operational architecture 1400 in an implementation of the boundary detection workflows discussed with respect to FIG. 13. Architecture 1400 includes a data model 1401 corresponding to a live workbook. The model includes a worksheet model 1403 corresponding to a specific worksheet in the workbook, as well as partial boundary annotations 1405 and boundary annotations 1405. Grid neighborhoods are passed from the worksheet model 1403 to a grid neighborhood workflow, which determines boundaries using one or both of a heuristic implementation 1409 and a model-based implementation (possibly assisted by a hosted model 1417). The architecture also includes a reduce workflow 1413 with a boundary stitching algorithm 1415 for stitching together portions of an unstructured table that may have been split when being uploaded.

The table boundary detection uses a grid/reduce pattern with two workflows to accommodate large sheets too large to process in a single workflow. Efficiency may be improved by supporting partial updates. The grid workflow runs on a neighborhood of cells to detect a partial table boundary. The workflow may be implemented by one or both of a heuristic algorithm implemented in the workflow itself, and model-based algorithm that calls DLIS. The workflow emits partial table boundary annotations to be stored in the augmentation loop data model. Updates to the partial table boundary annotations trigger the reduce workflow. The reduce workflow may then stitch them into one or more full table boundary annotations and emits them back to the data model.

Figure 15:
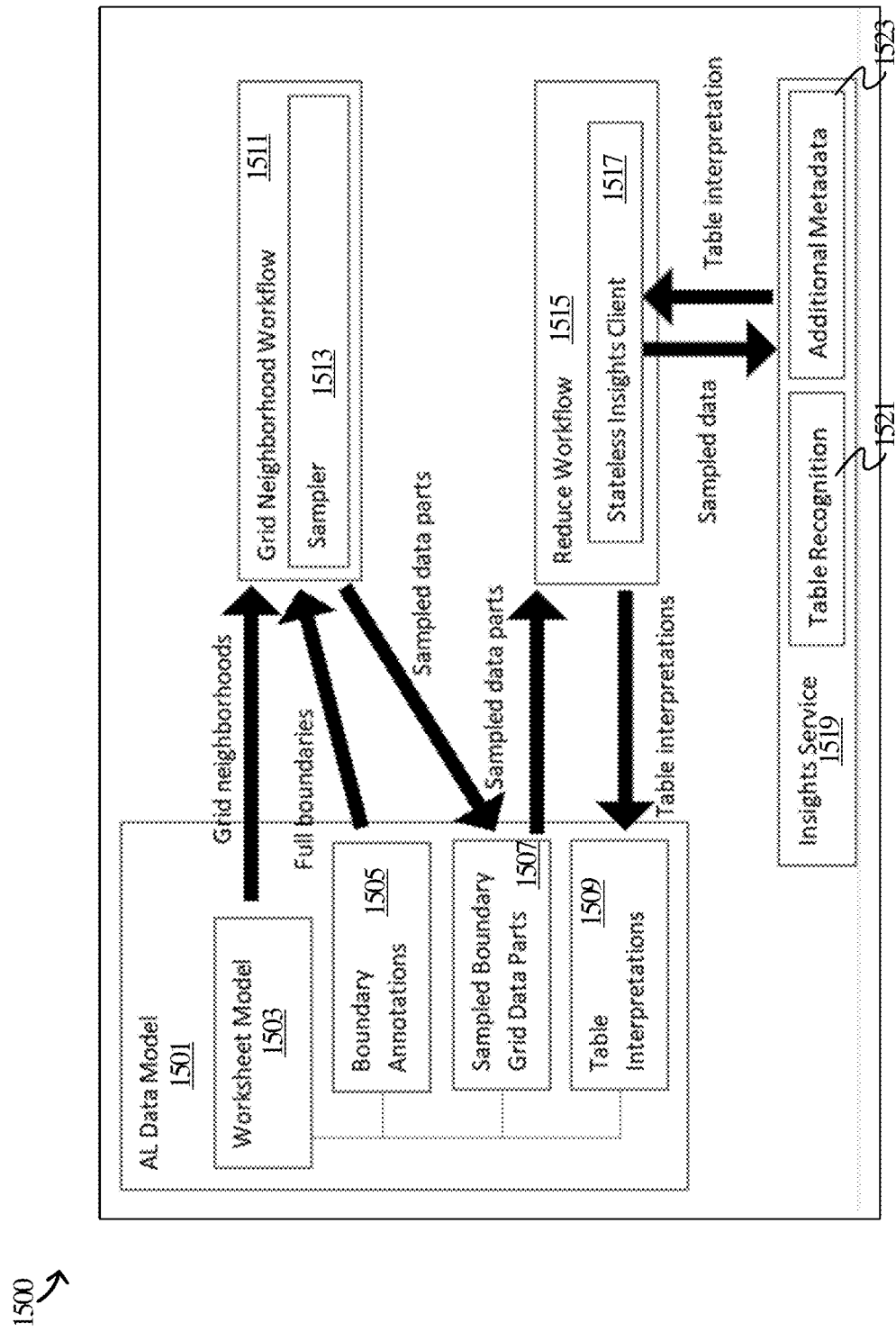
FIG. 15 illustrates an operational architecture in an implementation.

FIG. 15 includes another operational architecture 1500 in an implementation of the table interpretation workflows discussed with respect to FIG. 13. Architecture 1500 includes a data model 1501 and worksheet model 1503. Worksheet model 1503 passes grid neighborhoods to a grid neighborhood workflow 1511, which includes a sampler function 1513 for identifying promising portions of the grid.

Boundary annotations 1505 passes full boundaries to workflow 1501. Sampler function 1513 passes sampled data parts 1507 to data model 1501, which are then passed to a reduce workflow 1515. Workflow 1515 includes a stateless insights client 1517 that produces table interpretations. Client 1517 passes sampled data to an insights service 1519, which produces table recognition data 1521 and additional metadata 1523, which may be returned to data model 1505.

Figure 16:
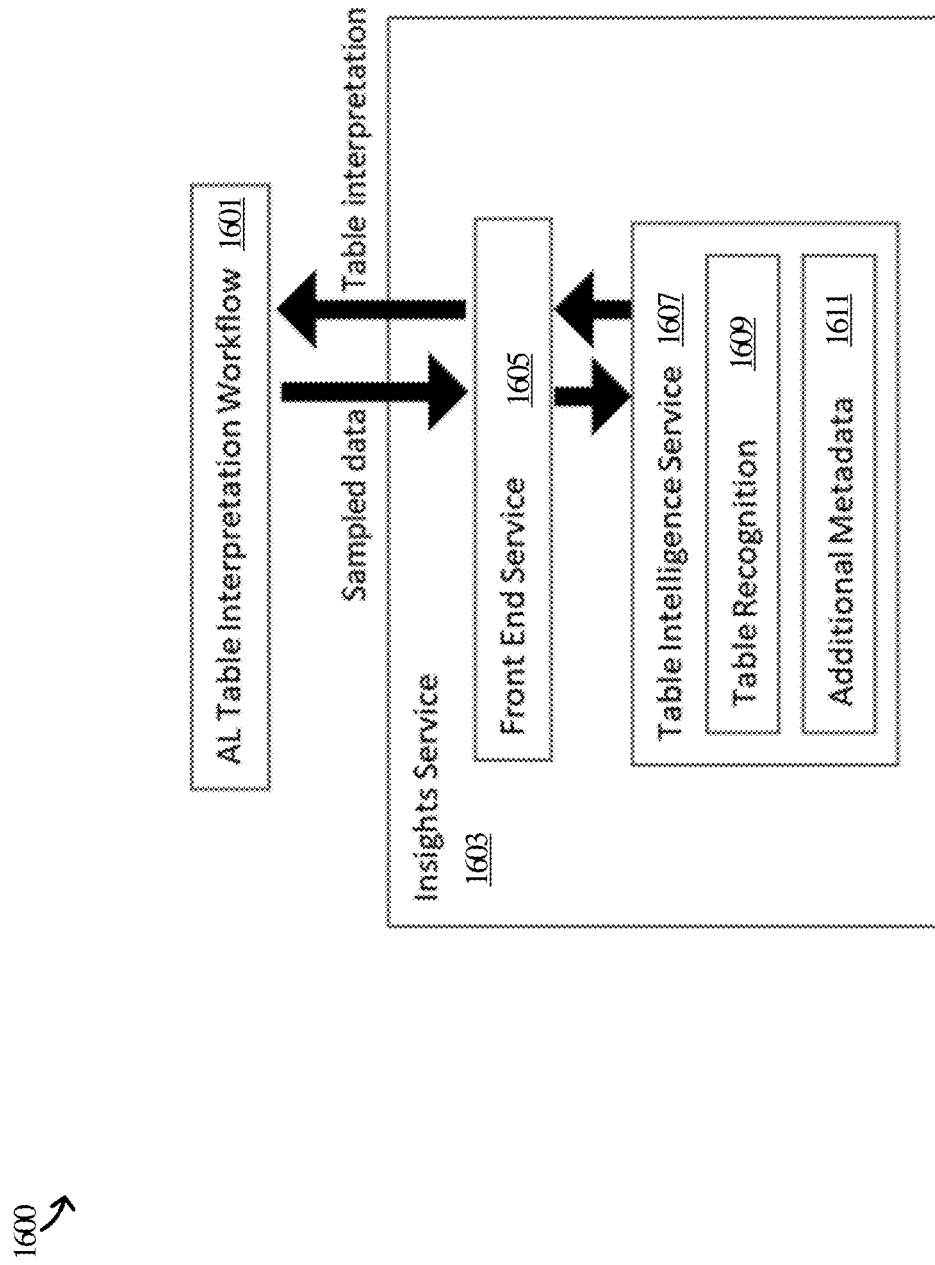
FIG. 16 illustrates an operational architecture in an implementation.

Table interpretation uses a grid/reduce pattern with two workflows. The grid workflow produces views of the data contained in each of the detected table boundaries, while the reduce workflow collates and sends this data to insights service 1319 to generate table interpretations. The grid workflow has two purposes: firstly, to provide access to the grid data such that the reduce workflow can retrieve all data for a detected table boundary at the same time in the same thread; and secondly, to sample down the data for large boundaries to limit CPU, memory, and network usage. The reduce workflow collates the partial data views into one for each full range boundary and POSTs the collated views to insights service 1319. The returned table interpretations are then passed back to augmentation loop 1303 as table annotations FIG. 16 illustrates another operational architecture 1600 in implementation of insights service 1319 in FIG. 13. Architecture 1600 includes a table interpretation workflow 1601 which sends sampled data to the front-end 1605 of an insights service 1603. A table intelligence service 1607 analyzes the data to produce table recognitions 1609 and additional metadata 1611, which are returned to workflow 1601. In operational architecture 1600, a new microservice is added to insights service 1319 to support clients like augmentation loop 1303 that simply want to POST a range and get table interpretations, rather than spin up a stateful session and generate recommendations. In an implementation, existing API models for range data and interpretations can be used, but the model for range data is extended to allow sending sampled data. Along with the front-end service, the table intelligence service can be scaled out independently from the rest of the service to support the large workloads that should be brought in by the augmentation loop workflow.

Figure 17:
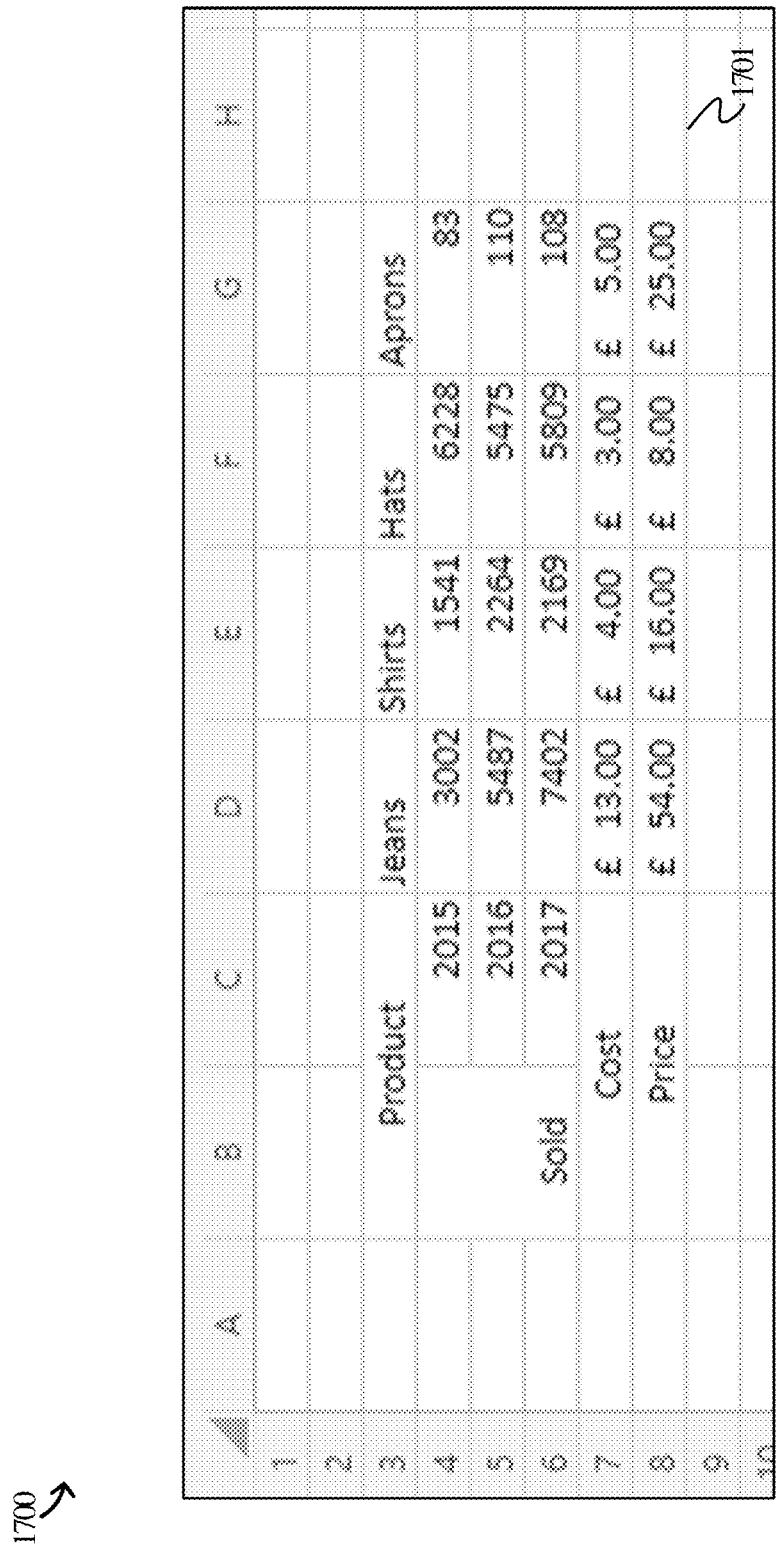
Figure 20:
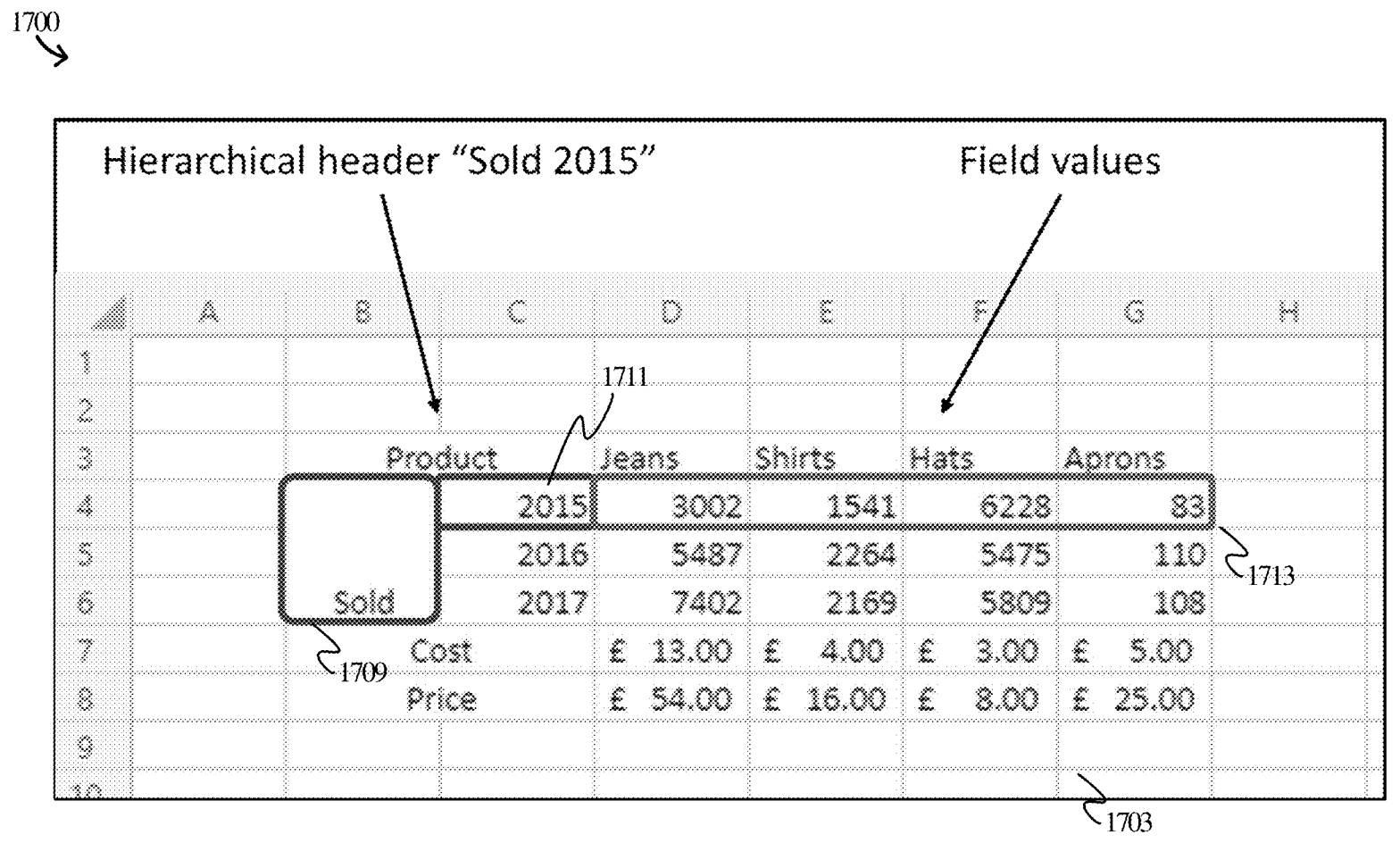

FIG. 17 illustrates a view 1700 of a spreadsheet and cell grid 1701 in a representative example. FIG. 18 illustrates the unstructured table 1703 discovered in cell grid 1701 by an augmentation process as contemplated herein. FIG. 19 illustrates the headers 1705 and values 1707 that may also be discovered by such processes. FIG. 20 illustrates hierarchical headers 1709 and 1711, as well as field values 1713. FIG. 21 illustrates various classifications that may be discovered about the table, such as dimensions and measures.

FIG. 22 illustrates another view 2200 of a representative spreadsheet 2203. View 220 includes an unstructured table 2201 with a discovered boundary. FIG. 23 illustrates headers 2207, 2205 and data regions 2209 that may be auto-discovered and annotated in metadata by an augmentation process.

Figure 24:
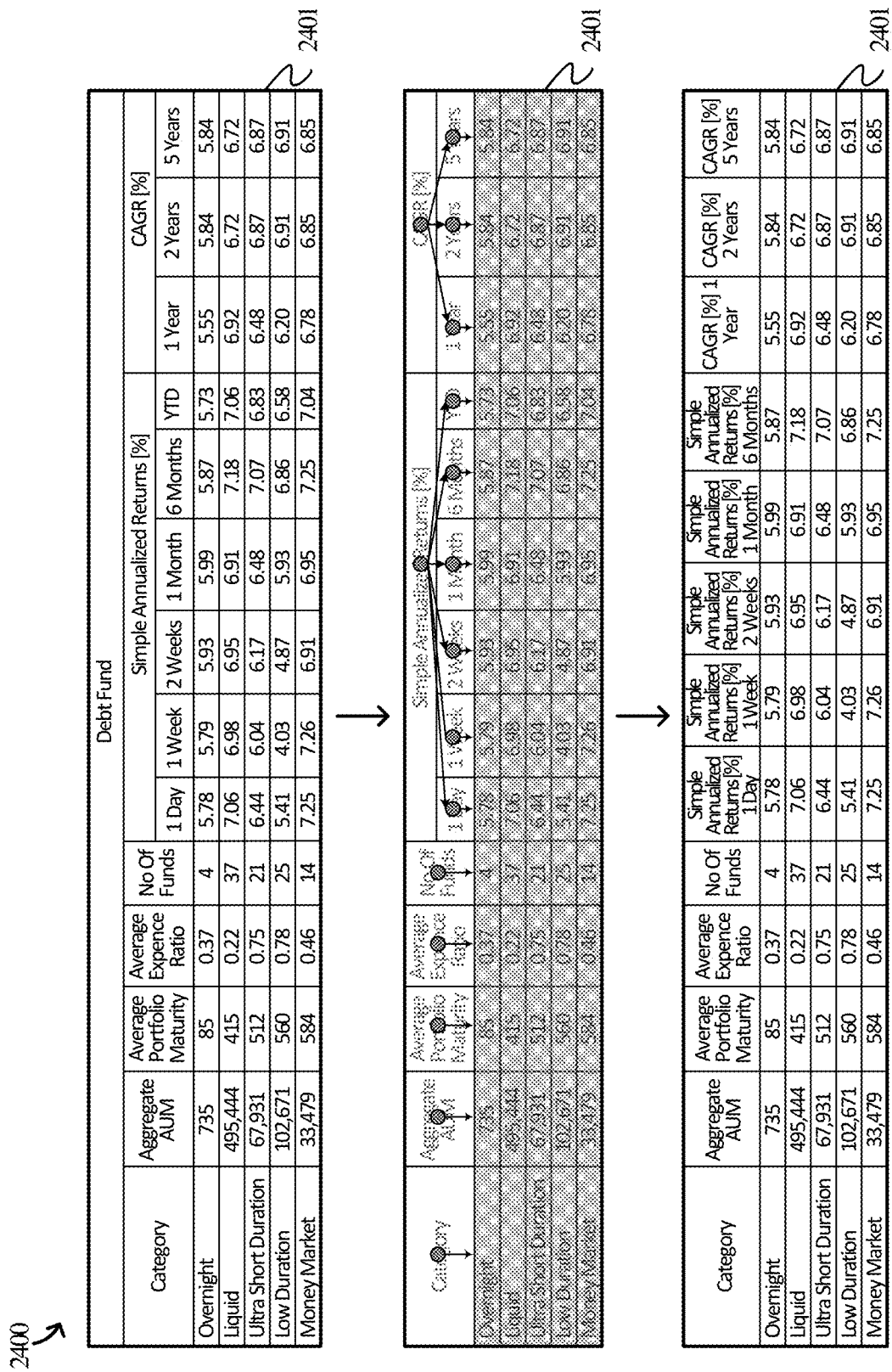
FIG. 24 illustrates an operational scenario in an implementation.

FIG. 24 illustrates an operational scenario 2400 in which a hierarchical header structure is detected and deconstructed in an unstructured table 2401. FIG. 25 illustrates an implementation 2500 in which an augmentation process obtains metadata indicative of the dimensions and measures of different columns of data, as well as their semantics.

Figure 26:
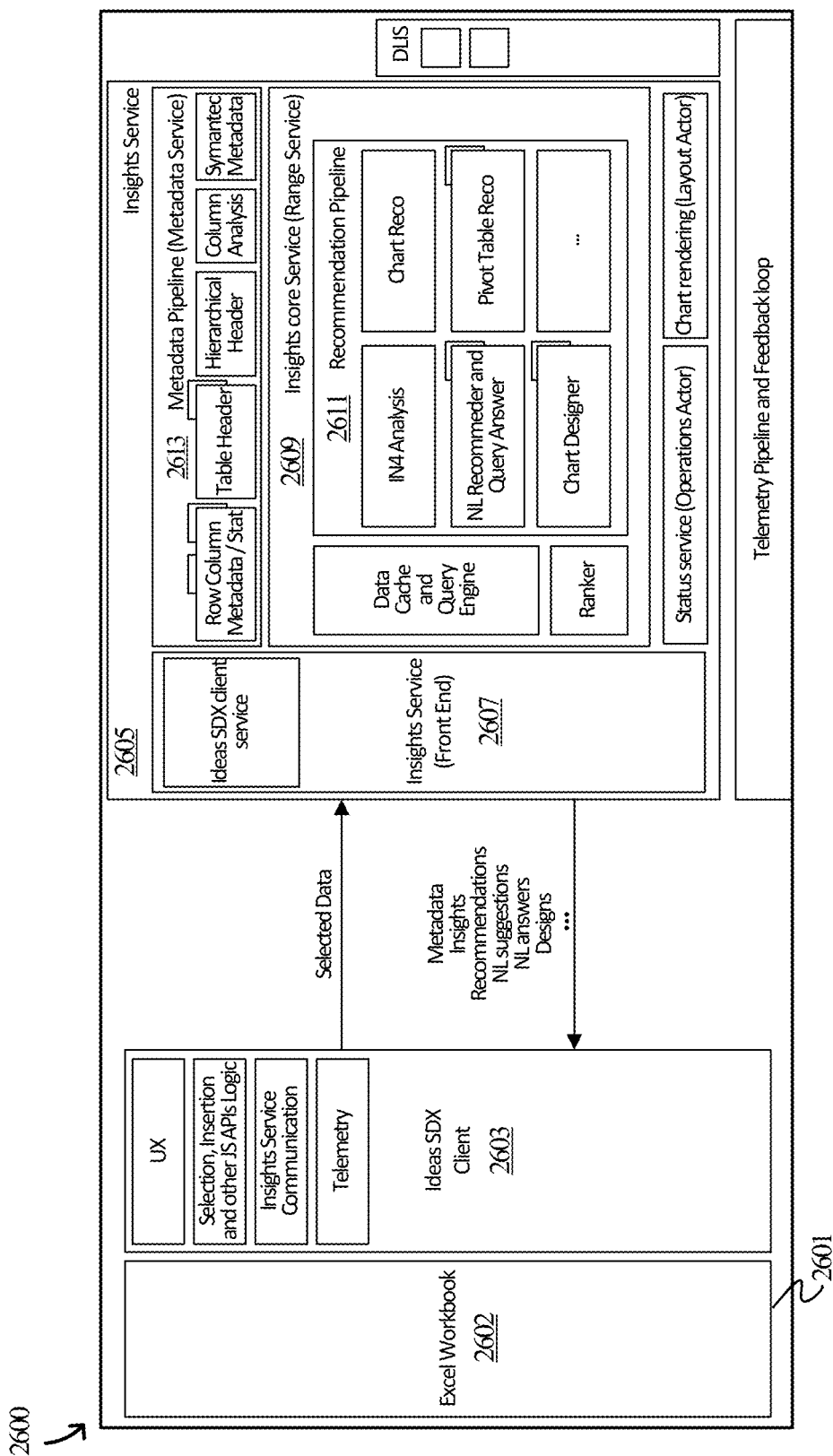
FIG. 26 illustrates an operational architecture in an implementation.

FIG. 26 illustrates another operational architecture 2600. Architecture 2600 includes a spreadsheet application 2601 (local or online/browser-based) that includes a workbook 2602 and an ideas client 2603 for communicating with an insights service 2605. The insights service includes a front-end 2607, a core service 2609, and a metadata pipeline 2613. Core service 2609 includes a recommendations pipeline 2611 for making recommendations. Metadata pipeline 2613 may be implemented as a microservice and produces metadata for workbook 2602 as contemplated herein.

Figure 27:
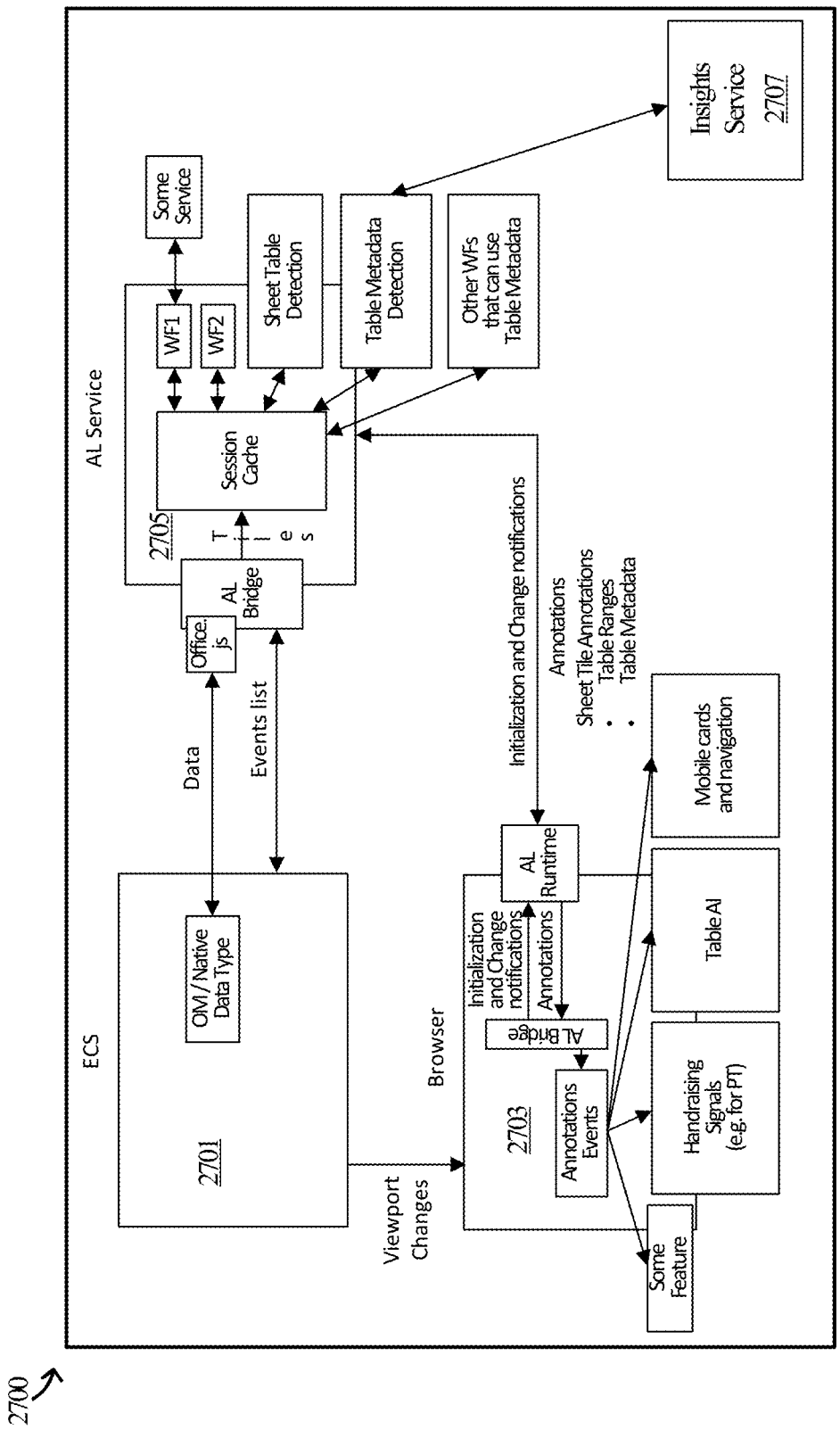
FIG. 27 illustrates an operational architecture in an implementation.

FIG. 27 illustrates another operational architecture 2700, which includes a spreadsheet calculation service 2701 that provides viewport changes to an application 2703 in a browser. The application 2703 obtains annotations from augmentation service 2705. The application monitors for annotation events, the occurrence of which triggers one or more feature previews or other enhances, including hand raising signals, mobile cards, pivot tables, and the like. Augmentation service 2705 executes various workflows to discover unstructured tables in cell grids, from which it derives the annotations that is supplies to application 2703. Augmentation service 2705 may also communicate with insights service 2707 to obtain and/or leverage its analysis capabilities.

It may be appreciated that the architectures and concepts illustrated in FIGS. 13-16, FIG. 26, and FIG. 27 may be combined, integrated, and/or overlap in a variety of ways and are not intended to be exclusive with respect to each other.

FIG. 28 illustrates computing device 2801 that is representative of any system or collection of systems in which the various processes, programs, services, and scenarios disclosed herein may be implemented. Examples of computing device 2801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 2801 may be implemented as a single apparatus, system, or device or may be implemented in a distributed manner as multiple apparatuses, systems, or devices. Computing device 2801 includes, but is not limited to, processing system 2802, storage system 2803, software 2805, communication interface system 2807, and user interface system 2809 (optional). Processing system 2802 is operatively coupled with storage system 2803, communication interface system 2807, and user interface system 2809.

Processing system 2802 loads and executes software 2805 from storage system 2803. Software 2805 includes and implements process 2806, which is (are) representative of the processes discussed with respect to the preceding Figures, such as process 200. When executed by processing system 2802, software 2805 directs processing system 2802 to operate as described herein for at least the various processes, operational scenarios, and sequences discussed in the foregoing implementations. Computing device 2801 may optionally include additional devices, features, or functionality not discussed for purposes of brevity.

Referring still to FIG. 28, processing system 2802 may comprise a micro-processor and other circuitry that retrieves and executes software 2805 from storage system 2803. Processing system 2802 may be implemented within a single processing device but may also be distributed across multiple processing devices or sub-systems that cooperate in executing program instructions. Examples of processing system 2802 include general purpose central processing units, graphical processing units, application specific processors, and logic devices, as well as any other type of processing device, combinations, or variations thereof.

Storage system 2803 may comprise any computer readable storage media readable by processing system 2802 and capable of storing software 2805. Storage system 2803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 2803 may also include computer readable communication media over which at least some of software 2805 may be communicated internally or externally. Storage system 2803 may be implemented as a single storage device but may also be implemented across multiple storage devices or sub-systems co-located or distributed relative to each other. Storage system 2803 may comprise additional elements, such as a controller, capable of communicating with processing system 2802 or possibly other systems.

Software 2805 (including process 2806) may be implemented in program instructions and among other functions may, when executed by processing system 2802, direct processing system 2802 to operate as described with respect to the various operational scenarios, sequences, and processes illustrated herein. For example, software 2805 may include program instructions for implementing a process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 2805 may include additional processes, programs, or components, such as operating system software, virtualization software, or other application software. Software 2805 may also comprise firmware or some other form of machine-readable processing instructions executable by processing system 2802.

In general, software 2805 may, when loaded into processing system 2802 and executed, transform a suitable apparatus, system, or device (of which computing device 2801 is representative) overall from a general-purpose computing system into a special-purpose computing system customized to support table discovery and suggestions in an optimized manner. Indeed, encoding software 2805 on storage system 2803 may transform the physical structure of storage system 2803. The specific transformation of the physical structure may depend on various factors in different implementations of this description. Examples of such factors may include, but are not limited to, the technology used to implement the storage media of storage system 2803 and whether the computer-storage media are characterized as primary or secondary storage, as well as other factors.

For example, if the computer readable storage media are implemented as semiconductor-based memory, software 2805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 2807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 2801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
one or more computer readable storage media;
one or more processors operatively coupled with the one or more computer readable storage media; and
program instructions stored on the one or more computer readable storage media that, when executed by the one or more processors, direct the computing apparatus to at least:
cause a spreadsheet to be displayed in a user interface;
pre-obtain metadata from a remote service that pre-identifies an unstructured table in the spreadsheet, wherein the metadata includes a range of cells belonging to the unstructured table in the spreadsheet, and wherein the unstructured table is not formatted as a table;
detect a user action in the spreadsheet after having pre-obtained the metadata;
identify an active cell associated with the user action;
determine, based on the range of cells identified in the pre-obtained metadata, that the active cell belongs to the unstructured table;
in response to determining that the active cell belongs to the unstructured table, cause a suggestion component to be displayed in the user interface; and
in response to a selection of the suggestion component, display at least a preview of a suggested table feature in the user interface.

2. The computing apparatus of claim 1 wherein the program instructions further direct the computing apparatus to:
monitor user actions in the spreadsheet for those associated with the unstructured table.

3. The computing apparatus of claim 2 wherein the spreadsheet comprises a cell grid defined by columns and rows, and wherein the unstructured table comprises a subset of cells within the cell grid defined by a subset of the columns and rows and encompassing less than an entirety of the cell grid.

4. The computing apparatus of claim 3 wherein the user actions comprise selections of single cells, selections of groups of cells, and sorting actions, and wherein the user action comprises a selection of a single cell such that the single cell is the only active cell in the spreadsheet.

5. The computing apparatus of claim 4 wherein the program instructions further direct the computing apparatus to:
generate the preview based at least on a portion of the metadata.

6. The computing apparatus of claim 5 wherein, to pre-obtain the metadata from the remote service, the program instructions direct the computing apparatus to:
send content from a superset of cells in the cell grid to the remote service, wherein the superset of cells includes the subset of the cells and other cells in the cell grid; and
receive the metadata in return from the remote service.

7. The computing apparatus of claim 6 wherein the suggested table feature comprises a suggested pivot table generated from at least a portion of the unstructured table.

8. The computing apparatus of claim 6 wherein the suggested table feature comprises a suggested cards view generated from at least a portion of the unstructured table.

9. A method comprising:
on a computing device, displaying a spreadsheet in a user interface;
on a computing device, pre-obtaining metadata, from a remote service, that pre-identifies an unstructured table in the spreadsheet, wherein the metadata includes a range of cells belonging to the unstructured table in the spreadsheet, and wherein the unstructured table is not formatted as a table;
on the computing device, detecting a user action in the spreadsheet after having pre-obtained the metadata;
on the computing device, identifying an active cell associated with the user action;
on the computing device, determining, based on the range of cells identified in the pre-obtained metadata, whether the active cell belongs to the unstructured table;
on the computing device, and in response to determining that the active cell belongs to the unstructured table, displaying a suggestion component in the user interface; and
on the computing device, and in response to a selection of the suggestion component, displaying at least a preview of a suggested table feature in the user interface.

10. The method of claim 9 further comprising, on the computing device:
monitoring user actions in the spreadsheet for those associated with the unstructured table.

11. The method of claim 10 wherein the spreadsheet comprises a cell grid defined by columns and rows, and wherein the unstructured table comprises a subset of cells within the cell grid defined by a subset of the columns and rows and encompassing less than an entirety of the cell grid.

12. The method of claim 11 wherein the user actions comprise selections of single cells, selections of groups of cells, and sorting actions, and wherein the user action comprises a selection of a single cell such that the single cell is the only active cell in the spreadsheet.

13. The method of claim 12 further comprising, on the computing device:
generating the preview based at least on a portion of the metadata.

14. The method of claim 13 wherein, pre-obtaining the metadata from the remote service comprises:
sending content from a superset of cells in the cell grid that includes the subset of the cells and other; and
receiving the metadata in return from the remote service.

15. The method of claim 14 wherein the suggested table feature comprises a suggested pivot table generated from at least a portion of the unstructured table.

16. One or more computer readable storage media having program instructions stored thereon that, when executed by one or more processors in a computing device, direct the computing device to at least:
display a spreadsheet in a user interface;
pre-obtain metadata from a remote service that pre-identifies an unstructured table in the spreadsheet, wherein the metadata includes a range of cells belonging to the unstructured table in the spreadsheet, and wherein the unstructured table is not formatted as a table;
detect a user action in the spreadsheet after having pre-obtained the metadata;
identify an active cell associated with the user action;
determine, based on the range of cells identified in the pre-obtained metadata, that the active cell belongs to the unstructured table;

in response to determining that the active cell belongs to the unstructured table, display a suggestion component in the user interface;

receive a selection of the suggestion component; and in response to the selection of the suggestion component, display a preview in the user interface of a pivot table for the unstructured table in the user interface.

17. The one or more computer readable storage media of claim 16 wherein the program instructions further direct the computing device to:

monitor user actions in the spreadsheet for those associated with the unstructured table.

18. The one or more computer readable storage media of claim 17 wherein:

the spreadsheet comprises a cell grid defined by columns and rows; and the unstructured table comprises a subset of cells encompassing less than an entirety of the cell grid.

19. The one or more computer readable storage media of claim 18 wherein the program instructions further direct the computing device to:

generate the preview based at least on a portion of the metadata.

20. The one or more computer readable storage media of claim 19 wherein, to pre-obtain the metadata from the remote service, the program instructions direct the computing device to:

send content from a superset of cells in the cell grid to the remote service, wherein the superset of cells includes the subset of the cells and other cells in the cell grid; and receive the metadata in return from the remote service.

* * * * *